Dec. 26, 1961 J. M. BLACKHALL 3,014,987

AUTOMATIC TOLL TICKETING TELEPHONE SYSTEM

Filed Aug. 15, 1957 19 Sheets-Sheet 1

INVENTOR.
JAMES M. BLACKHALL

BY C. A. Gulbrandsen

ATTY.

AUTOMATIC TOLL TICKETING TELEPHONE SYSTEM

Filed Aug. 15, 1957

19 Sheets-Sheet 2

INVENTOR.
JAMES M. BLACKHALL

BY

C. A. Gulbrandsen

ATTY.

INVENTOR.
JAMES M. BLACKHALL
BY C. A. Gulbrandsen
ATTY.

INVENTOR.
JAMES M. BLACKHALL
BY
C. A. Dulbrandsen
ATTY.

INVENTOR.
JAMES M. BLACKHALL
BY
C. A. Gulbrandsen
ATTY.

Dec. 26, 1961 J. M. BLACKHALL 3,014,987

AUTOMATIC TOLL TICKETING TELEPHONE SYSTEM

Filed Aug. 15, 1957 19 Sheets-Sheet 6

INVENTOR.
JAMES M. BLACKHALL

BY
C. A. Gulbrandsen

ATTY.

Dec. 26, 1961 J. M. BLACKHALL 3,014,987

AUTOMATIC TOLL TICKETING TELEPHONE SYSTEM

Filed Aug. 15, 1957 19 Sheets-Sheet 7

INVENTOR.
JAMES M. BLACKHALL
BY
C. A. Gulbransen
ATTY.

INVENTOR.
JAMES M. BLACKHALL
BY
C. A. Gullbrandsen
ATTY.

INVENTOR.
JAMES M. BLACKHALL

BY
C. A. Gulbrandsen
ATTY.

INVENTOR.
JAMES M. BLACKHALL
BY
C. A. Gulbrandsen
ATTY.

Dec. 26, 1961 J. M. BLACKHALL 3,014,987

AUTOMATIC TOLL TICKETING TELEPHONE SYSTEM

Filed Aug. 15, 1957 19 Sheets-Sheet 11

INVENTOR.
JAMES M. BLACKHALL

BY C. A. Gullbrandsen

ATTY.

INVENTOR.
JAMES M. BLACKHALL
BY
C. A. Gullbrandsen
ATTY.

INVENTOR.
JAMES M. BLACKHALL
BY
C. A. Gulbrandsen
ATTY.

INVENTOR.
JAMES M. BLACKHALL
BY C. A. Gulbrandsen
ATTY.

Dec. 26, 1961 J. M. BLACKHALL 3,014,987

AUTOMATIC TOLL TICKETING TELEPHONE SYSTEM

Filed Aug. 15, 1957

19 Sheets-Sheet 15

INVENTOR.
JAMES M. BLACKHALL

BY C. A. Gulbrandsen

ATTY.

Dec. 26, 1961 J. M. BLACKHALL 3,014,987

AUTOMATIC TOLL TICKETING TELEPHONE SYSTEM

Filed Aug. 15, 1957

19 Sheets-Sheet 16

INVENTOR.
JAMES M. BLACKHALL

BY C. A. Gulbrandsen

ATTY.

INVENTOR.
JAMES M. BLACKHALL
BY
C. A. Gulbrandsen
ATTY.

Dec. 26, 1961 J. M. BLACKHALL 3,014,987

AUTOMATIC TOLL TICKETING TELEPHONE SYSTEM

Filed Aug. 15, 1957 19 Sheets-Sheet 18

INVENTOR.
JAMES M. BLACKHALL

BY

C. A. Gullbrandsen
ATTYS.

INVENTOR.
JAMES M. BLACKHALL
BY
C. A. Gulbrandsen
ATTY.

United States Patent Office 3,014,987
Patented Dec. 26, 1961

3,014,987
AUTOMATIC TOLL TICKETING TELEPHONE SYSTEM

James M. Blackhall, La Grange, Ill., assignor to Automatic Electric Laboratories, Inc., a corporation of Delaware Filed Aug. 15, 1957, Ser. No. 678,419
2 Claims. (Cl. 179—7.1)

Figure 1:
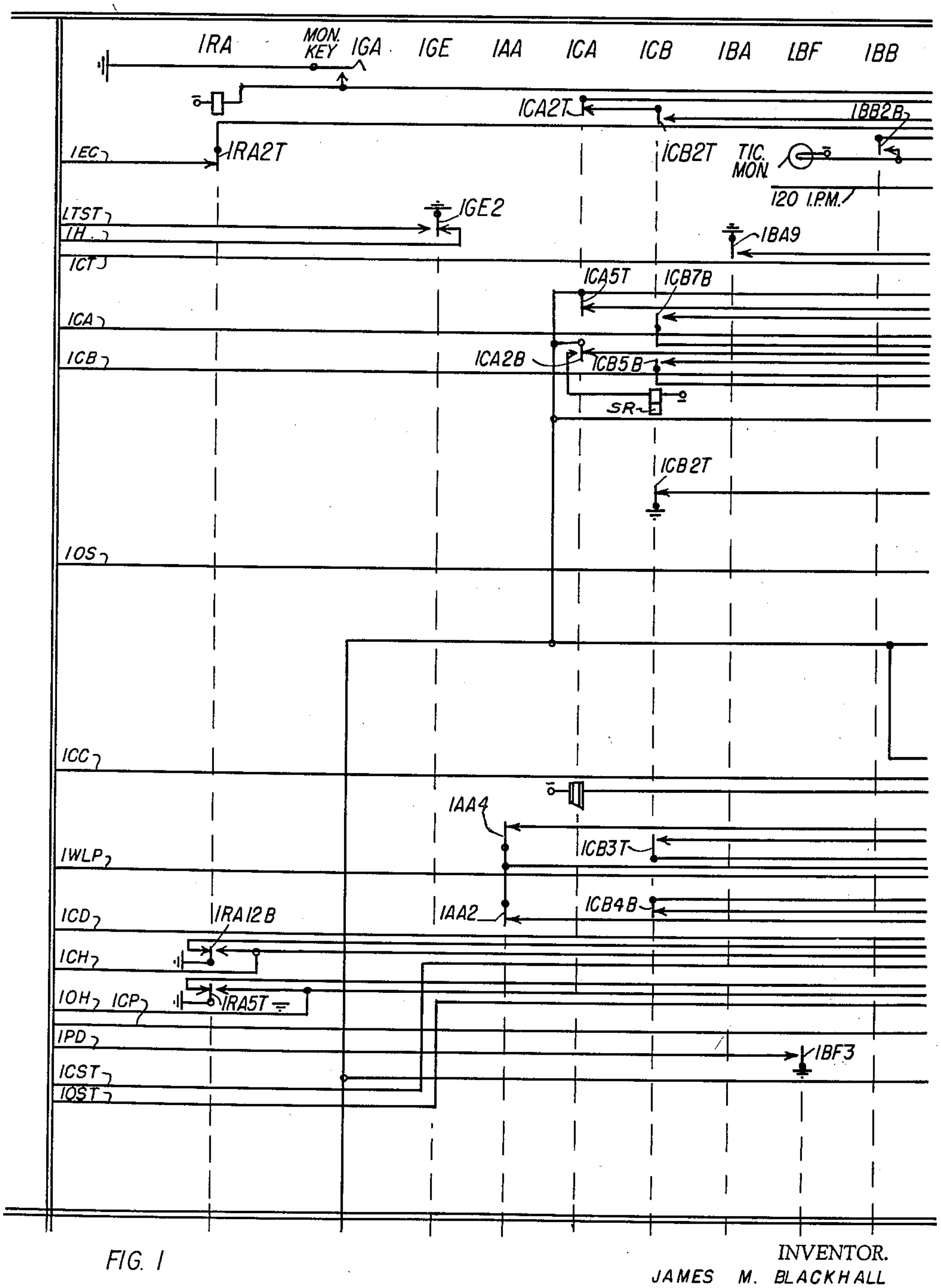
Figure 1A:
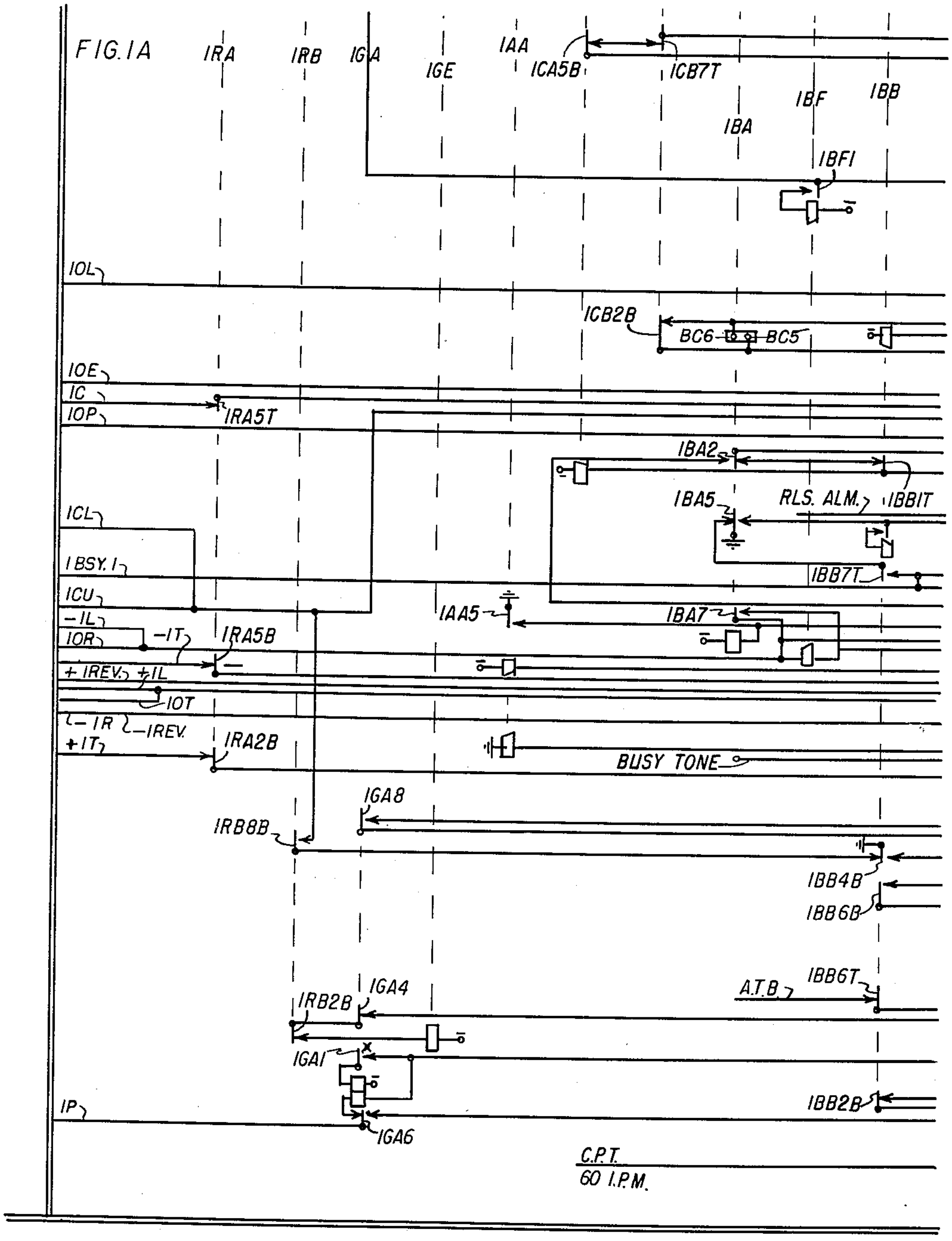
Figure 2:
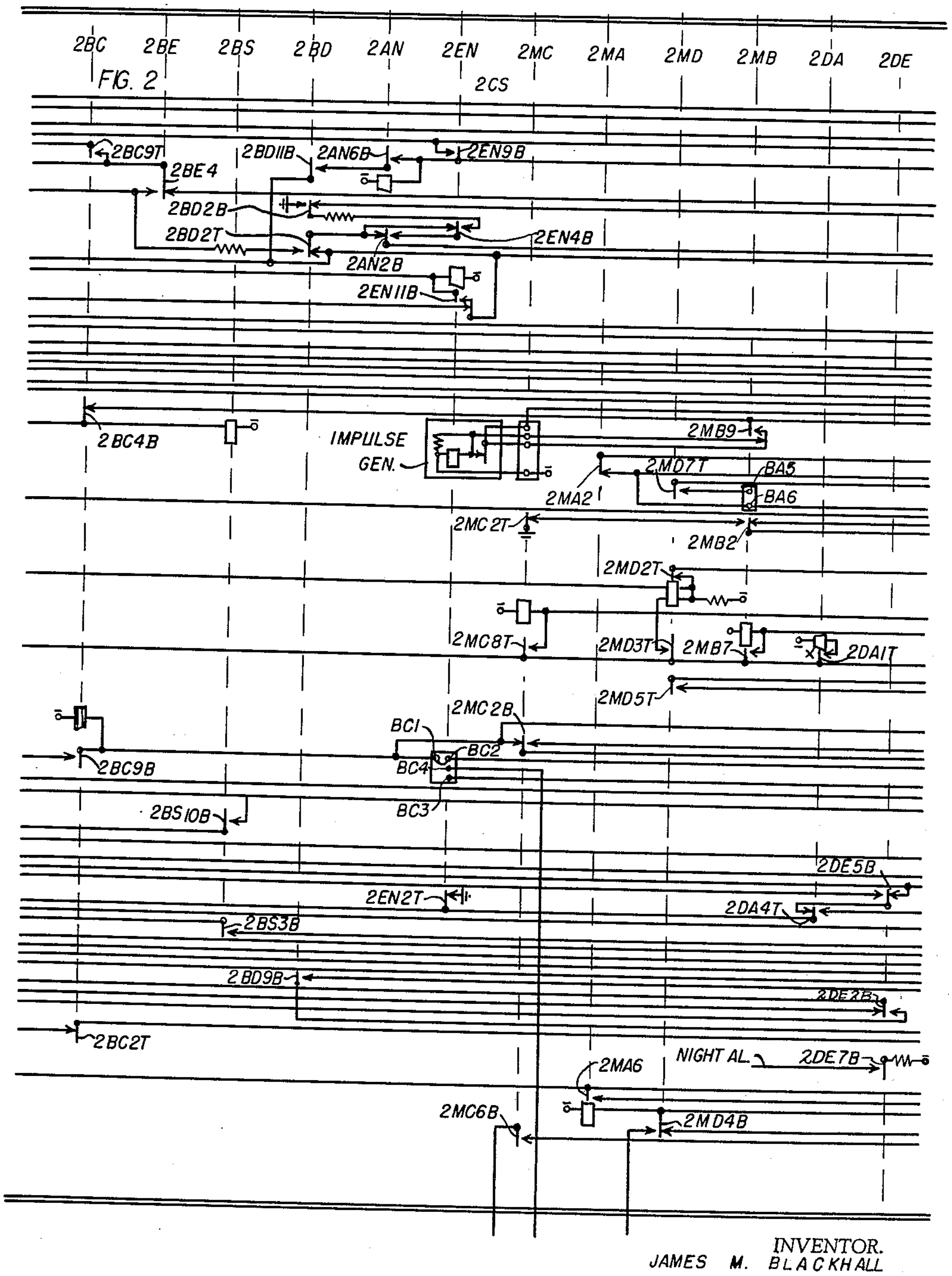
Figure 2A:
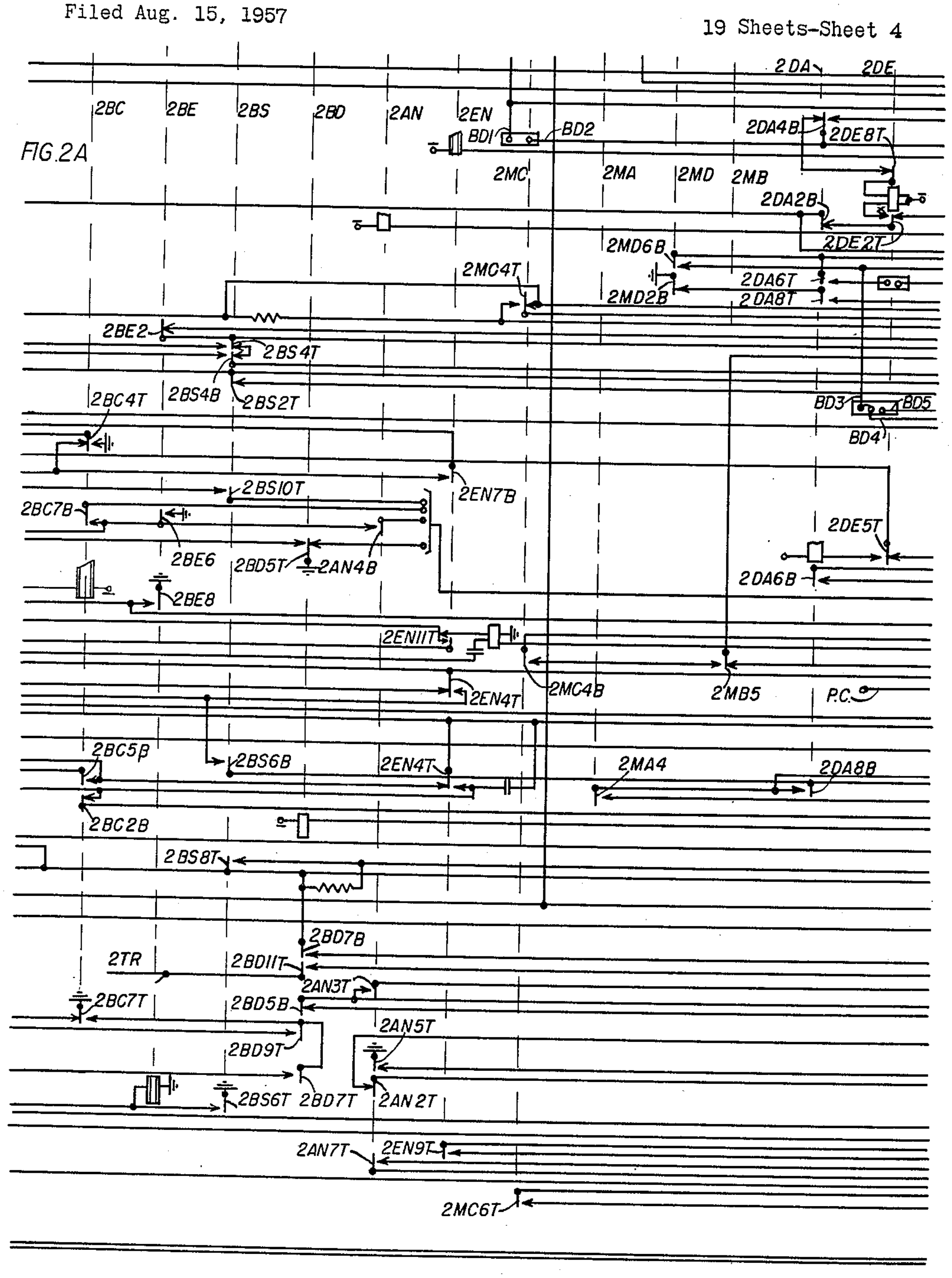
Figure 3:
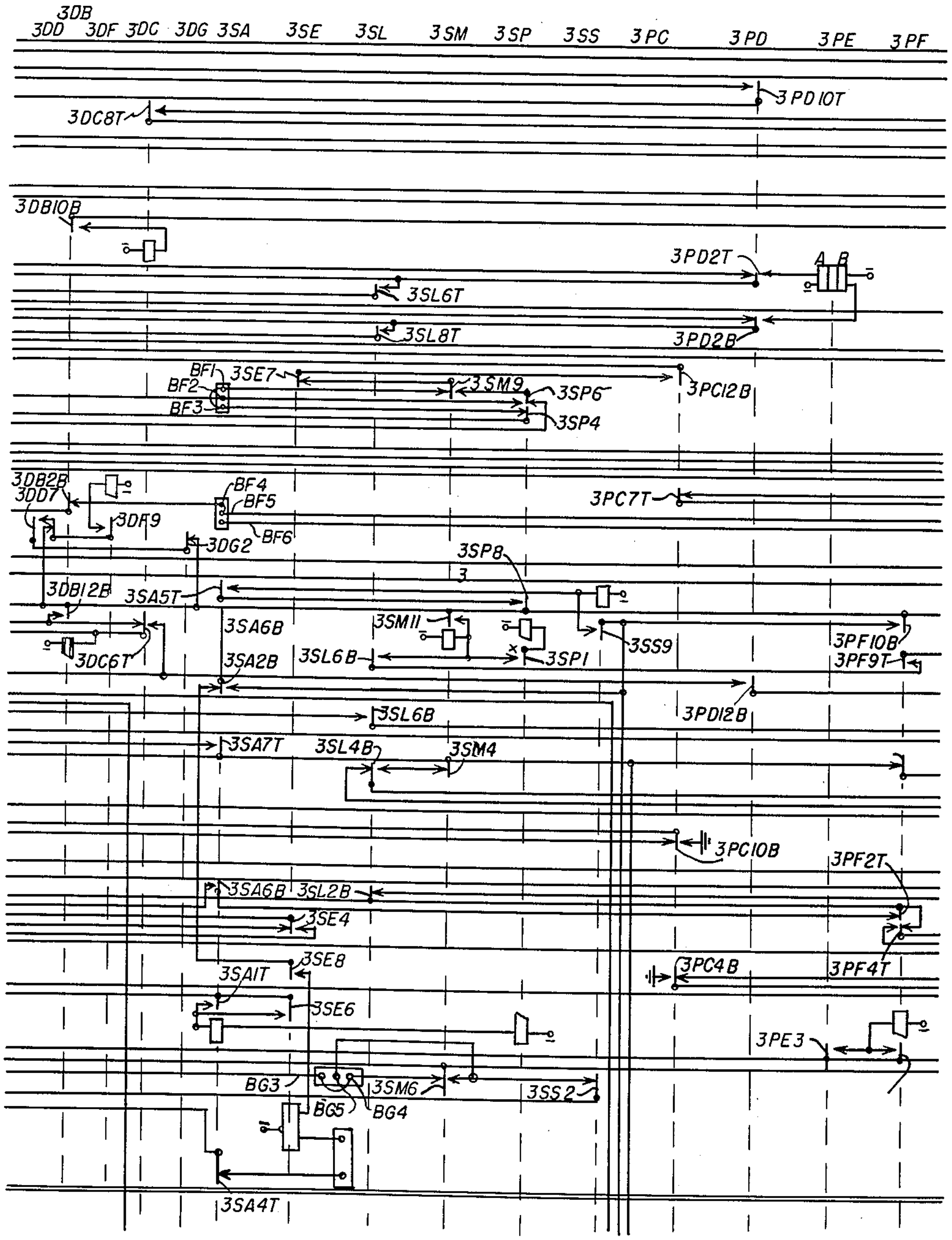
Figure 3A:
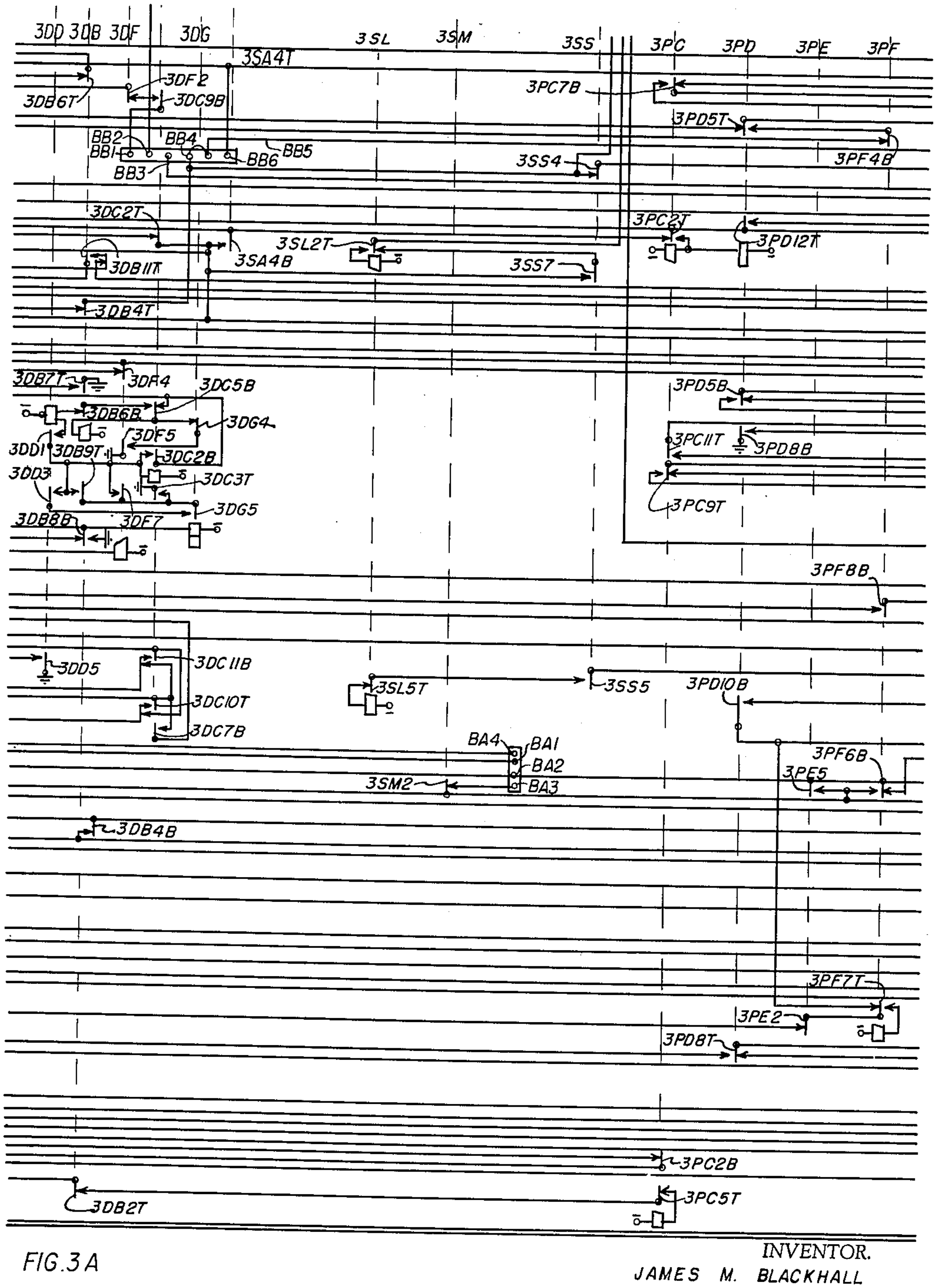

This invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

In prior automatic toll ticketing telephone networks of the type disclosed in the Ostline and Taugner patent application, Serial No. 650,508, toll telephone connections are established under the control of common equipment accessed by a code dialled into the local switch train by the calling subscriber. The common equipment usually included a toll ticketing repeater, a calling line directory number detector, a translator-sender circuit to insure that the digits are properly dialled into the succeeding exchange and a tabulator with its associated daters and ticket perforators to compile the data pertaining to the call and make a record of it. This type of ticketing equipment has met with great success when used in offices of moderate size. To further increase the economies offered by systems of this general type, the equipment has been improved so that the advantages of toll ticketing may be extended to exchanges where it is economically unfeasible to install a bulkier more expensive and complete toll ticketing equipment of other existing types. This is performed by an arrangement which has been designed for exchange networks containing a number of smaller dial offices connected to a common attended office for toll and special services where these manual facilities continue to be available, this system can provide customer toll dialling for subscribers connected to the various dial offices of such a network at a comparatively low cost. In operation with this system, in making a toll call the subscriber dials only the number of the called station. Ticketers serving a dial office or a group of dial offices of this type are located at a point generally in the office where the manual switch board is located. No special trunks, trunking equipment or calling number detectors are required to the various automatic offices; therefore existing trunking facilities can be used without added equipment.

The automatic station subscriber desiring a station to station toll connection, will dial the toll access code and then the directory number of this desired station. After the access code has been dialled, the call is extended to a ticketer in the main office. When the called station number is dialled it is stored in the ticketer. As soon as the last digit of the called station has been dialled a connection is automatically extended from the ticketer to a circuit at the manual board. This control circuit at the manual board includes besides a key or jack ended trunk a key type pulse sender. After a certain number of the digits of the called number are dialled the ticketer will immediately call for and be connected to a free coder-codexer from a common group.

The operator now enters the connection and verbally obtains from the calling subscriber the number of the calling station; she then keys that number back into the ticketer where it is stored. The operator then, by means of a release key, releases her trunk from the ticketer. As soon as the foregoing operation has been completed the coder-codexer transmits the digits of the called number from its storage and releases itself from the ticketer. The toll connection is now completed via the ticketer, and from this point on all functions are similar to those of a call in any other type of toll ticketing system.

Accordingly, it is the main object of the present invention to provide an automatic toll ticketing telephone system for use in telephone networks including relatively small exchanges in which it is not economical to install complete toll ticketing equipment that include detection equipment, but where it is desired to obtain the economies of central automatic ticketing by means of automatic ticketing equipment.

It is still another object of the invention to provide new and improved circuits and apparatus for accomplishing the above ticketing operations.

It is still another object of this invention to provide in a telephone system improved toll ticketing repeaters that are directly controllable by the calling subscriber dials to register the called station directory number and to record this information prior to calling for the services of an operator to obtain the calling station's directory number.

It is still another object of the invention to provide means in the toll ticketing repeater which is responsive to the registration of an incomplete called code from a calling line for routing the call on the calling line to an operator position.

It is still a further object of the invention to provide improved means in the ticketer for working with the coder and codexer whereby the sending of the called station code is under the control of the ticketer.

Further objects and features of the present invention pertain to the particular arrangement of the various circuit elements of the automatic toll ticketing telephone system, whereby the above objects and additional operating features are added.

Figure 9:
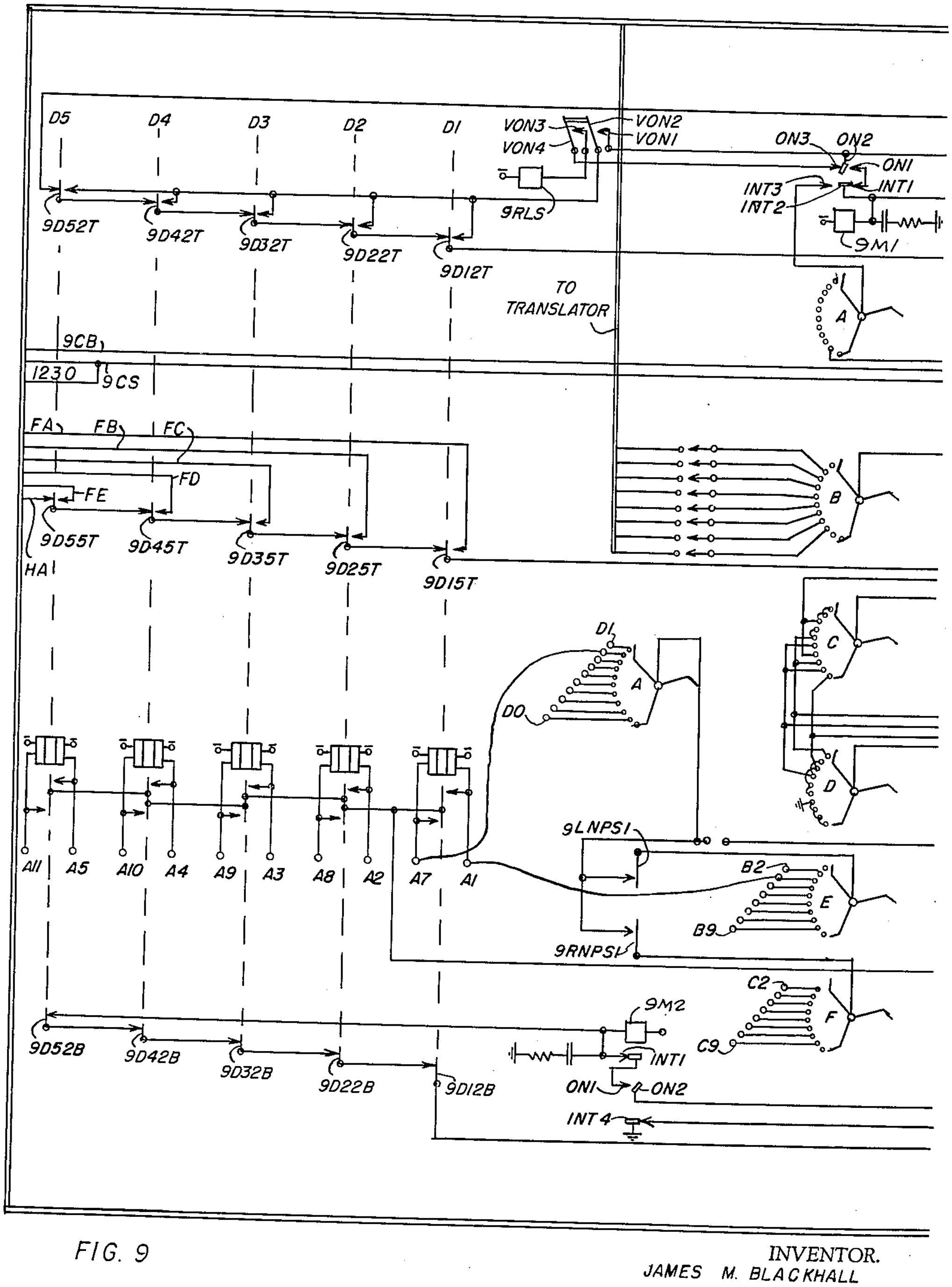
Figure 10:
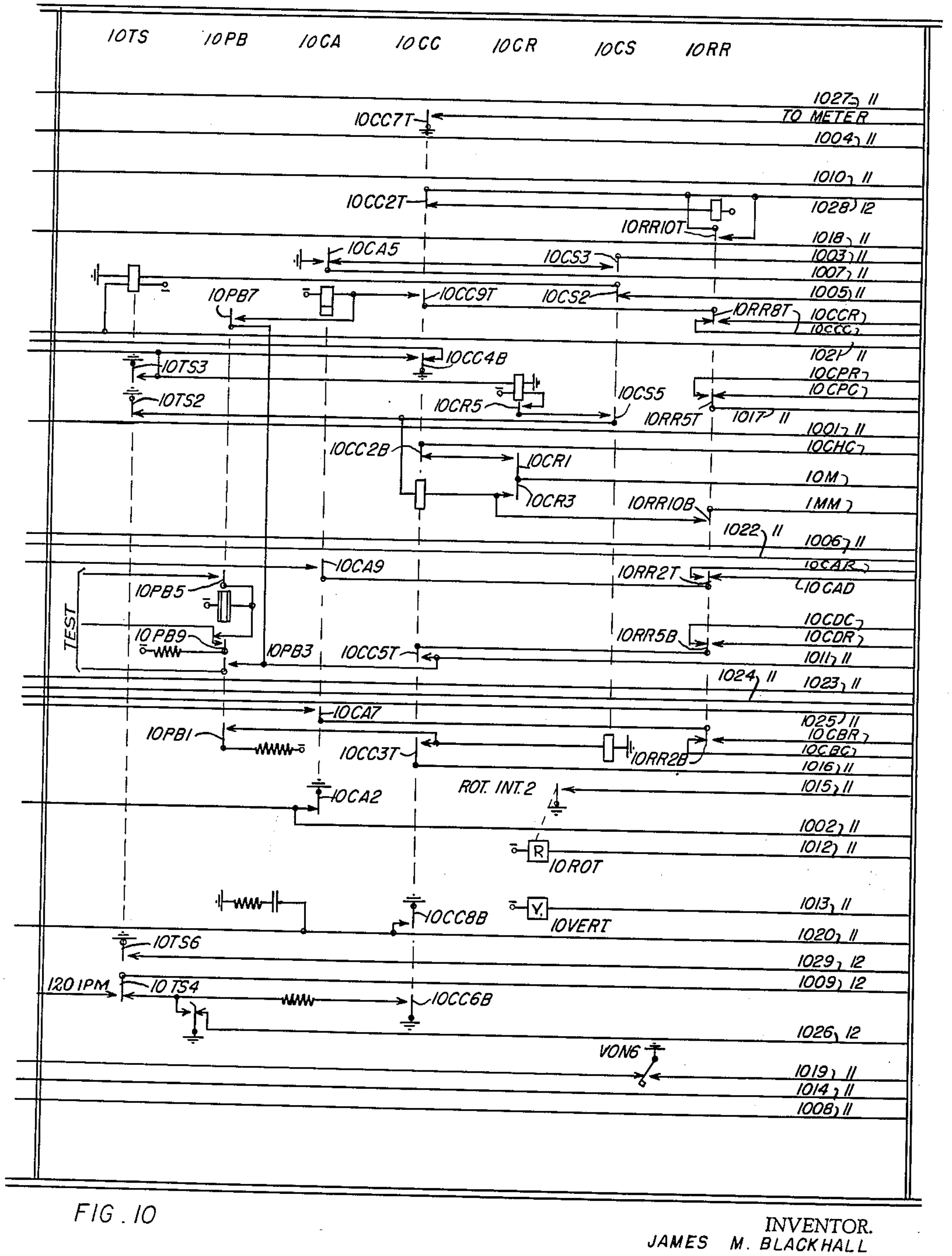
Figure 11:
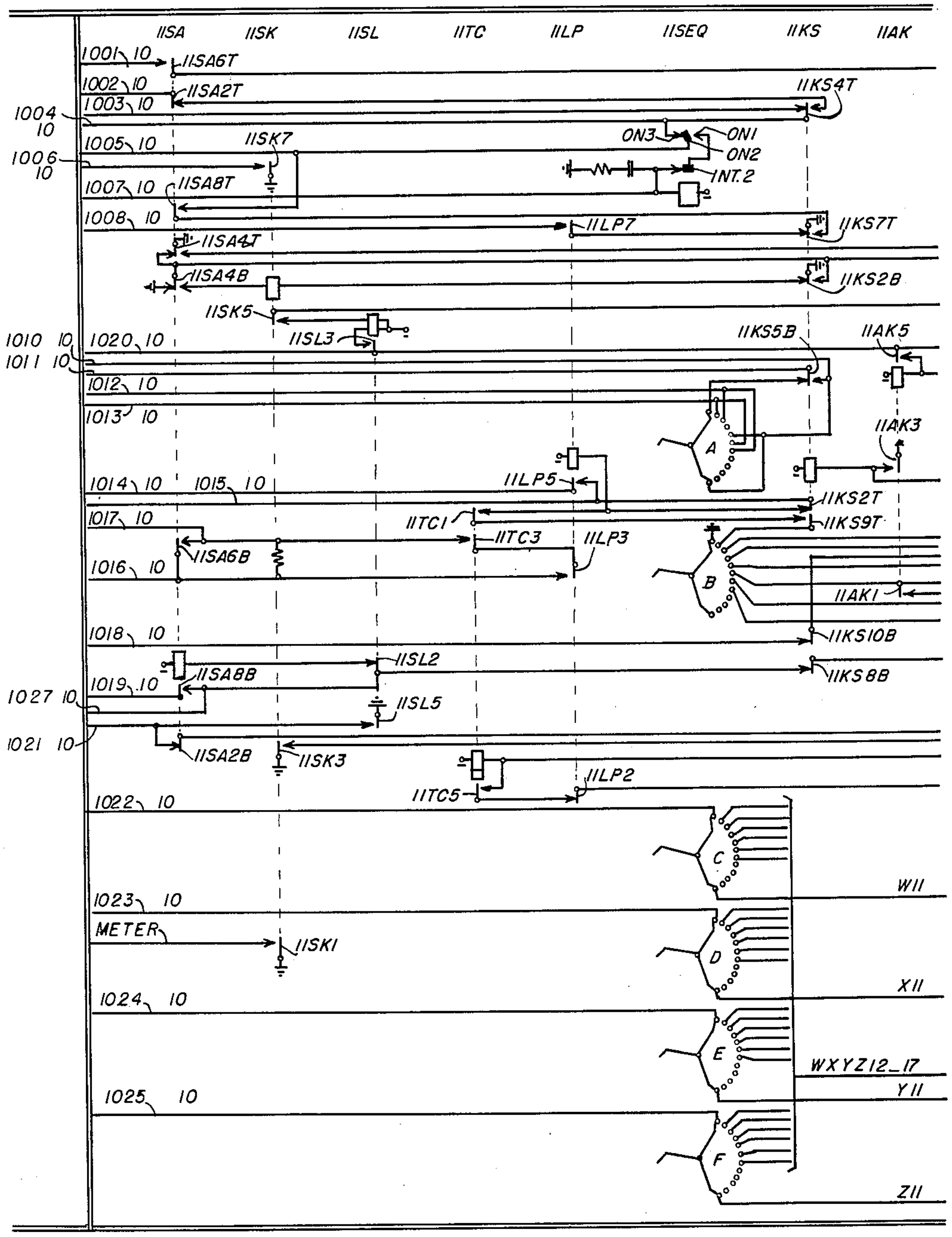
Figure 12:
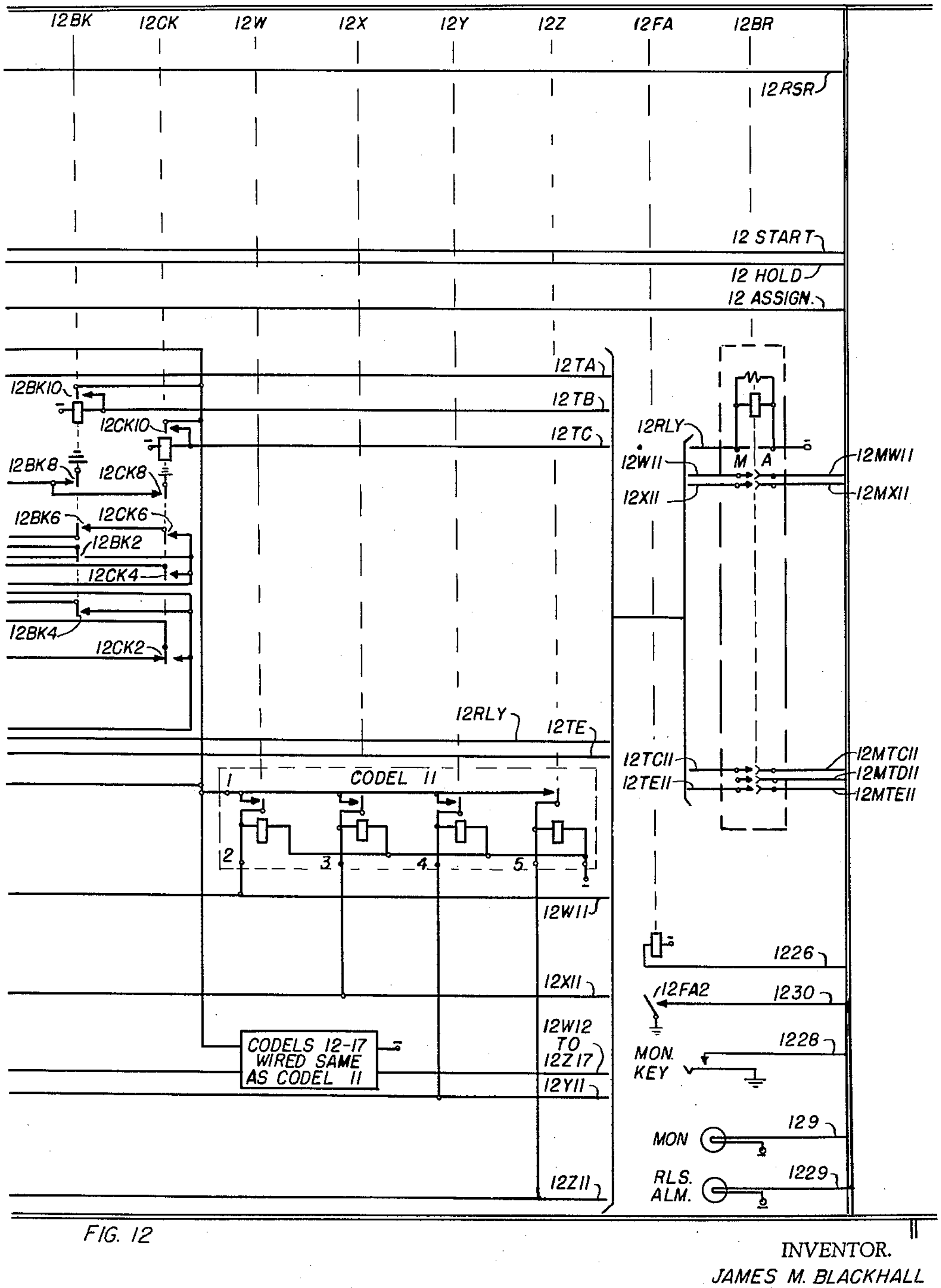
Figure 13:
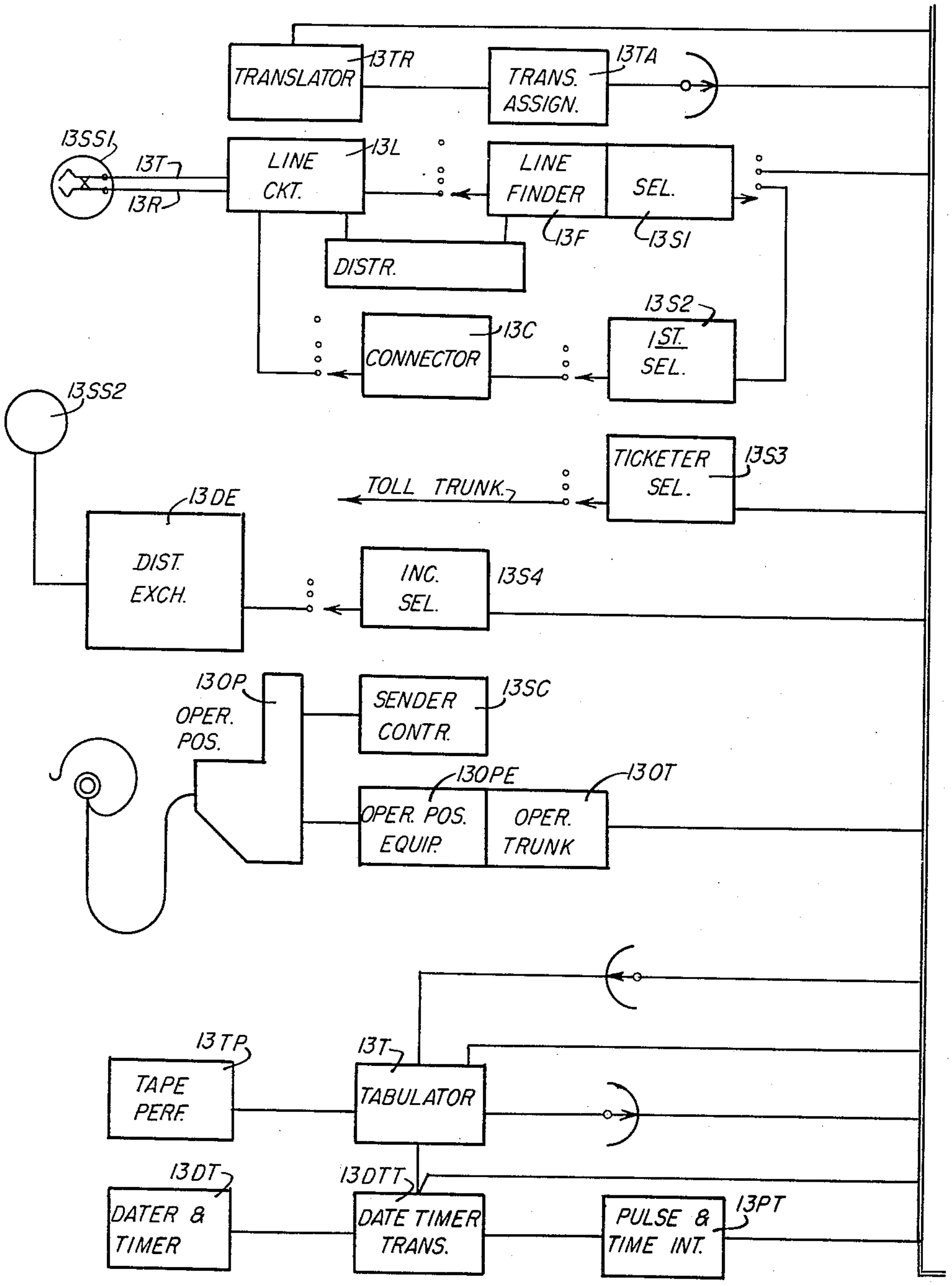

The invention, both as to its organization and method of operation, together with further objects and advantages thereover will best be understood by referring to the following specification taken in connection with the accompanying drawings in which FIGS. 1–4A, inclusive, illustrate in schematic form the details of the control unit portion of a ticketer and FIGS. 5, 6, 7–8A, inclusive, illustrate in schematic form the storage unit portion of a ticketer in the main exchange. FIGS. 9 and 10 illustrate in schematic form the details of the coder circuit, and FIGS. 11 and 12 illustrate in schematic form the details of the codexer circuit portion of the coder-codexer. FIG. 13 illustrates in schematic form the switching equipment, auxiliary toll ticketing equipment, a branch exchange and the operators equipment and trunk circuits. FIG. 14 illustrates the manner of combining FIGS. 1 to 13, inclusive, of the drawings to form a unified system.

FIGS. 1 to 8A, inclusive, illustrate in schematic form the details of a ticketer. It is used in type D automatic toll ticketing system installations and is seized from a local selector or an incoming trunk selector. It can handle: (1) Six or seven digit toll calls consisting of an AB office code and four or five terminal digits; (2) Seven or eight digit toll calls consisting of the ABC office code and four or five terminal digits; and (3) Ten or eleven digit toll calls into a foreign area consisting of a three digit area code, the ABC office code, and four or five terminal digits. The principal functions of the ticketer are as follows:

(1) It provides for absorbing the last digit of the access code.

(2) It provides for extending the call to a "D" operator when the calling party has completed dialling the called number.

(3) It provides for sending the office code and area code to the coder-codexer if translation is provided.

(4) It sends digits from the coder-codexer to the outgoing trunk and absorbs those digits of the called number which are not required for sending.

(5) It provides for stop-dial and flashing signal supervision.

(6) After an adjustable "grace period," it times the length of conversation from the time the called party answers until the calling party disconnects.

(7) It stores the following ticketing information during conversation: the calling number, the called number, and a change in toll rates indication, if it occurs during the call.

(8) After the the calling party disconnects, it transfers the ticketing information to a tabulator. During this time the calling line and outgoing trunk are released. The ticketer restores after transfer.

(9) If the call is not answered, the ticketer releases when the calling party disconnects and no ticketing information is recorded for the call.

(10) It provides visual supervision of the progress of a call through the ticketer by means of the TICK MON lamp.

To obtain the various operating options, the ticketer is arranged with terminal blocks where by means of strap wiring these are set up. The following table lists the strapping required for each of the options. The strap wiring marked with an asterisk is that shown on the drawings.

A 4 to 10 second grace period can be provided to prevent ticketing a "wrong number" call. The strapping to provide this period is per the following:

| Strap Wiring | Grace Period, Seconds |
|---|---|
| AD8-AE2, AD10-AE1 | 4 |
| AD8-AE4, AD10-AE1 | 5 |
| *AD8-AE5, AD10-AE2 | *6 |
| AD8-AE6, AD10-AE2 | 7 |
| AD8-AE7, AD10-AE3 | 8 |
| AD8-AE8, AD10-AE3 | 9 |
| AD8-AE9, AD10-AE4 | 10 |

To time the dialling intervals for dialling the called number the allotted time is determined by the strapping of the following table:

| Strap Wiring | Time Interval | |
|---|---|---|
| AA10-AA7 | 20 Sec | Allotted Time For Dialling 6, 7 or 10 Digits of Calling Number. |
| *AA10-AA8 | 25 Sec | |
| AA10-AA9 | 30 Sec | |
| AD9-AE1 | 2 Sec | Allotted Time For Dialling Last Digit of 7, 8 or 11 Digit Calling Number. |
| AD9-AE2 | 3 Sec | |
| AD9-AE3 | 4 Sec | |

Ticketer identity: Strap terminal AF10 to respective terminals AF1–AF4 for tens digit and to respective terminals AF5–AF8 for units digit to mark the ticketer identity in codel code. The codel code is a modified bi-quinary code in which the two out of five markings have been cut down to only a one or two out of four marking code.

The groups of four relays used to resigter digits in this

"codel" code are sometimes called codels, codel relays or codel register relays while the individual relay is referred to as the codel relay.

| Decimal Digit | Codel Code | Strap Wiring | | |
|---|---|---|---|---|
| | | Tens Digit | Units Digit | Hundreds Digit |
| 1 | WX | AF10-AF1-AF2 | AF10-AF5-AF6 | AF9-AF10. Not Codel Code. |
| 2 | WY | AF10-AF1-AF3 | AF10-AF5-AF7 | |
| 3 | WZ | AF10-AF1-AF4 | AF10-AF5-AF8 | |
| 4 | XY | AF10-AF2-AF3 | AF10-AF6-AF7 | |
| 5 | XZ | AF10-AF2-AF4 | AF10-AF6-AF8 | |
| 6 | YZ | AF10-AF3-AF4 | AF10-AF7-AF8 | |
| 7 | W | AF10-AF1 | AF10-AF5 | |
| 8 | X | AF10-AF2 | AF10-AF6 | |
| 9 | Y | AF10-AF3 | AF10-AF7 | |
| 0 | Z | AF10-AF4 | AF10-AF8 | |

This circuit provides operating options which are selected by means of strap wiring on terminal blocks A and B. The following is a list of strap wiring and associated options:

*Start sending and translation options*

| Strap Wiring | |
|---|---|
| *AA1-AB1 | Sending Starts With Operation Of Operator's Start Key. |
| *AA2-AB2 | |
| *AA3-AB3 | |
| *AA4-AB4 | |
| *AA5-AB5 | |
| *BG3-BG4 | |
| *BD3-BD4 | |
| *BF1-BF3 | |
| *BF4-BF5 | |
| AB1-AC1 | Translation Is provided and Sending Starts With Operation Of Operator's Wait Lamp. |
| AB2-AC2 | |
| AB3-AC3 | |
| AB4-AC4 | |
| AB5-AC5 | |
| AB6-AC6 | |
| BD4-BD5 | |
| BF4-BF6 | |
| BA1-BA4 | Translation Is Not Provided And Sending Starts With Operation Of Operator's Accept Key. |
| AC8-AC9 | |
| BA2-BA4 | |
| BF1-BF2 | |
| BG1-BG2 | |
| BG4-BG5 | |
| BD1-BD2 | Translation Is Provided. |
| BA5-BA6 | |
| BE1-BE2 | |
| BF1-BF3 | |
| AG8-AG9 | 6-7 Digit AB-Toll System. |
| AH2-AH3 | |
| BB5-BB6 | |
| AD1-AD2 | |
| AD3-AD4 | |
| AG6-AG7 | |
| *AG7-AG8 | 7 Digit AB-Toll System. |
| *AH1-AH2 | |
| *BB4-BB5 | |
| *AD1-AD3 | |
| AG9-AG10 | 7-8 Digit AB-Toll System. |
| AH1-AH2 | |
| BB5-BB6 | |
| AD1-AD3 | |
| AG7-AG8 | |

*Ticketer selector and translation options*

| Strap Wiring | |
|---|---|
| AC9-AC10 | Sending First Digit Of Calling Directive Is Not Required For Seizing Outgoing Trunk (Rotary Type Ticketer Selector Provided). |
| BA2-BA3<br>AC8-AC10 | Sending First Digit Of Calling Directive Is Not Required For Seizing Outgoing Trunk (Rotary Type Ticketer Selector Provided Plus Translation). |
| BA1-BA2<br>AC8-AC9 | Sending First Digit Of Calling Directive Is Required For Seizing Outgoing Trunk (Strowger Type Ticketer Selector Provided). |
| BA1-BA2-BA3<br>AC8-AC9 | Sending First Digit Of Calling Directive Is Required For Seizing Outgoing Trunk (Strowger Type Ticketer Selector Provided Plus Translation). |

*Calling no. and translation options*

| Strap Wiring | | |
|---|---|---|
| AG2–AG3–AG4–AG5 | No. Has 7 Digits | Translation Is Provided Or Translation Is Not Provided And Sending Starts With Operation Of Operator's Accept Key. |
| AG1–AG2–AG3–AG4–AG5. | No. Has 6 Digits | |
| AG1–AG2–AG3–AG4–AG5. | No. Has 5 Digits | |
| AG1–AG2–AG3–AG4 | No. Has 4 Digits | |
| AA6–AB6 | No. Has 7 Digits | Translation Is Not Provided. |
| AB6–AD5 | No. Has 6 Digits | |
| AB6–AD6 | No. Has 5 Digits | |
| *AB6–AD7 | No. Has 4 Digits | |

*No such no. routing options*

| Strap Wiring | |
|---|---|
| *BC1–BC4 | Return Busy Tone On All Area Codes. |
| *BC1–BC2 | Terminate In Busy Tone. |
| BC2–BC3 | Provide Translation Directive. |
| AB8–AB9 | 2 Digit Directive 6-7 Digit AB-Toll System. |
| AB7–AB8–AB9 | 3 Digit Directive 6-7 Digit AB-Toll System. |
| AB9–AB10 | 2 Digit Directive 7-8 Digit AB-Toll System. |
| AB8–AB9–AB10 | 3 Digit Directive 7-8 Digit AB-Toll System. |

*Timed out call options*

| Strap Wiring | |
|---|---|
| BB3–BB4 | Route Call To Operator. |
| *BB2–BB3 | Terminate In Busy Tone |

*Seizure options*

| Strap Wiring | |
|---|---|
| No Strap | One Digit Required To Cause Registration. |
| BC5–BC6 | Registration Upon Seizure. |

FIGS. 9 and 10 disclose in schematic form the details of the coder circuit. The functions of this circuit are:

(1) This circuit in conjunction with a codexer operates as a single unit.

(2) The coder receives a coded directive from the translator consisting of one to seven digits, stores this directive in the register relay units, and serves to control the operations of the ticketer. It sequentially forwards the routing directive to the ticketer when the ticketer is ready to accept the digits.

(3) This circuit controls the operation of the translator assigner and causes the translator to provide the coded directive when the office code and area code are received by the associated codexer.

FIGS. 11 and 12 disclose in schematic form the details of the codexer circuit. The functions of this circuit are:

(1) This circuit in conjunction with a coder operates as a single unit.

(2) The office code and/or area code of the called number is forwarded from the ticketer to the codexer via the coder. This information causes a Strowger switch to mark one of the 800 leads to the translator and to mark whether the call is for the home area or for a foreign area. The foreign area codes are temporarily registered on rotary switches and then mark one of the shunt field relays D1–D5.

(3) Shunt field relays provide means for identifying the area from the "A" and "C" digits of the office code.

(4) Five foreign area and one home area markings are provided for.

The strapping is as follows:

A maximum of five foreign area codes can be assigned for dual translation (over leads FA, FB, FC, FD and FE respectively) by strapping the terminal block as follows:

Second digit of foreign area code is "1." Strap respective terminals B2 to B9 corresponding to the first digits of such codes to respective terminals A1 to A5. Strap respective terminals D1 to D9, D0 corresponding to the last digits of such codes to terminals A7 to A11 respectively which pair terminals A1 to A5.

Second digit of foreign area code is "0." Strap respective terminals B2 to B9 corresponding to the first digits of such codes to respective terminals A1 to A5. Strap respective terminals D1 to D9, D0 corresponding to the last digits of such codes to terminals A7 to A11 respectively which pair terminals A1 to A5.

Paired terminal sets are: A1–A7, A2–A8, A3–A9, A4–A10 and A5–A11. Both terminals of a paired set must be strapped for satisfactory code assignment. Assign only one foreign area code to a paired set of "A" terminals.

The numeral designation for terminals B2 to B9, C2 to C9, and D1 to D9, D0 correspond to assigned digits in foreign area codes.

FIG. 13 illustrates in schematic block diagram form the switching equipment of the exchange, a subscriber line, a ticketer selector, a distant exchange that can be provided with toll ticketing service from this exchange, an operator's position and associated circuits, and a tabulator and associated circuits.

The operators equipment may be of any well known type. Typical circuits arranged to operate with a ticketer are disclosed in the copending application of J. E. Ostline and J. W. Taugner, Serial No. 650,508, filed April 3, 1957.

The translator is a group of relays which is used in conjunction with the coder-codexer for the purpose of supplying the coder-codexer with the necessary routing directive as determined by the first three or six digits registered in the codexer. The translator is common to the coder-codexer; it is seized only momentarily when a routing directive is required. The connection of the coder-codexer to the translator is controlled by the translator assigner. The transender and translator are described in greater detail in the Ostline, Coleman and Taugner application, Serial No. 628,474, filed December 3, 1956.

The tabulator circuit's function is to forward toll call ticketing data to tape perforators. The toll call ticketing data consists of information received from the ticketer, the dater-timer, and from the tabulator itself.

The information received from the ticketers consists of the ticketer identity number (three digits), conversation time (three digits), called number (seven, ten or eleven digits), calling number (five digits) and a possible change in rates during call conversation timing indication. The information received from the dater-timer consists of the calendar date (day and month), the time of day and a day or night rate indication. The dater-timer is directly connected to the tabulator via a dater-timer transfer circuit. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data received from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators. The tabulator is described in greater detail in the Ostline application, Serial No. 625,773, filed December 3, 1956.

Figures 4, 14:
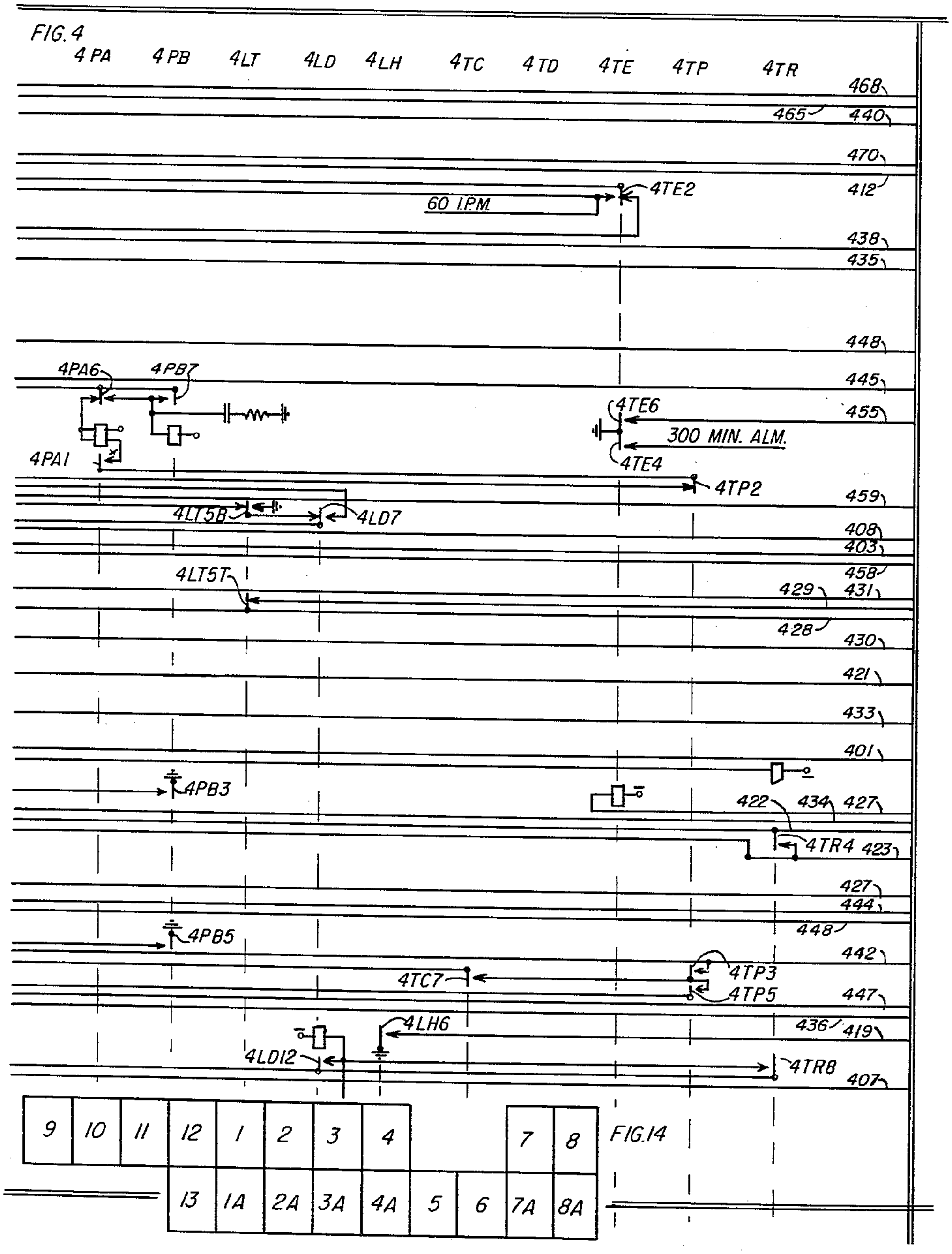
Figure 4A:
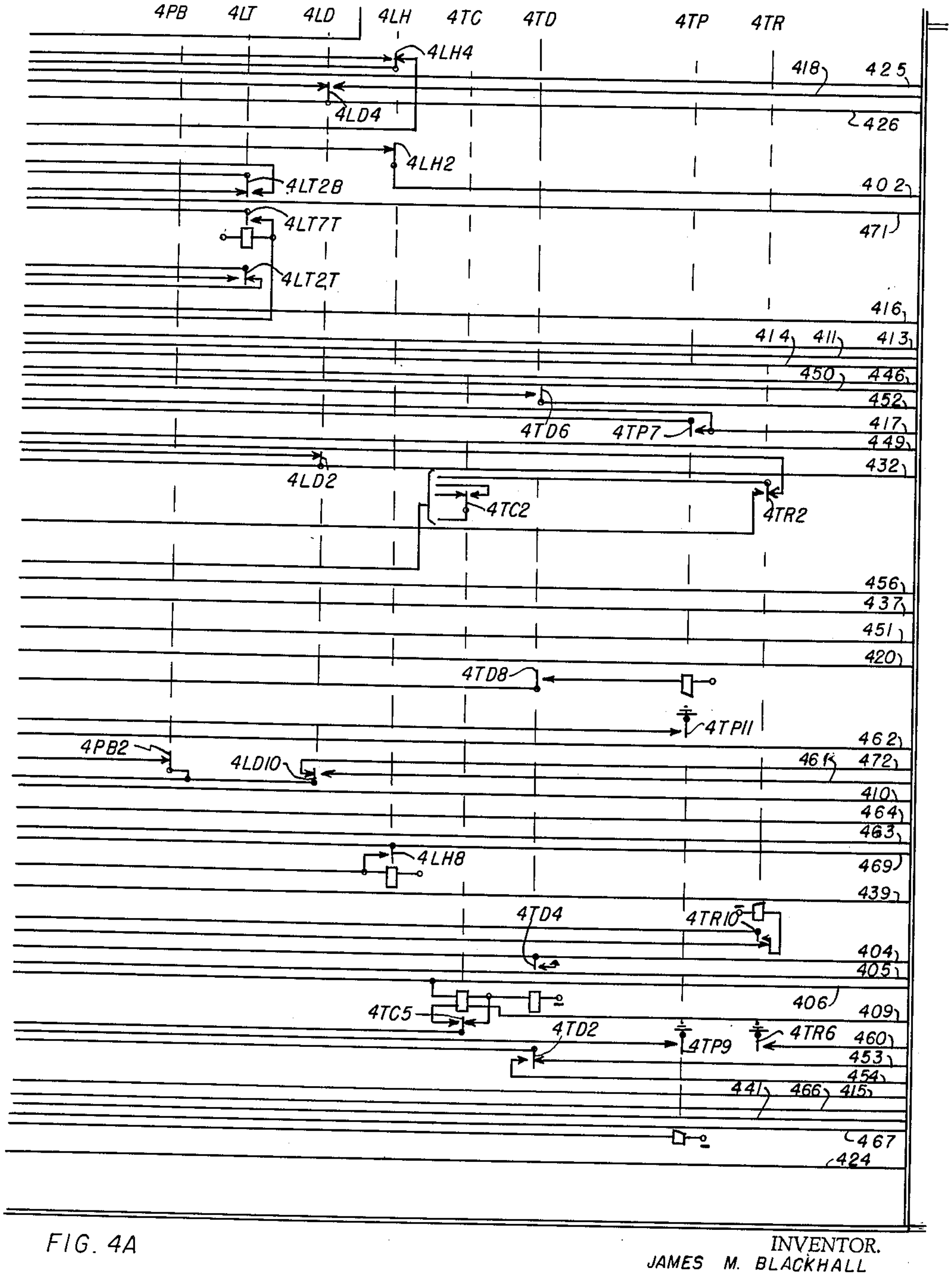
Figure 5:
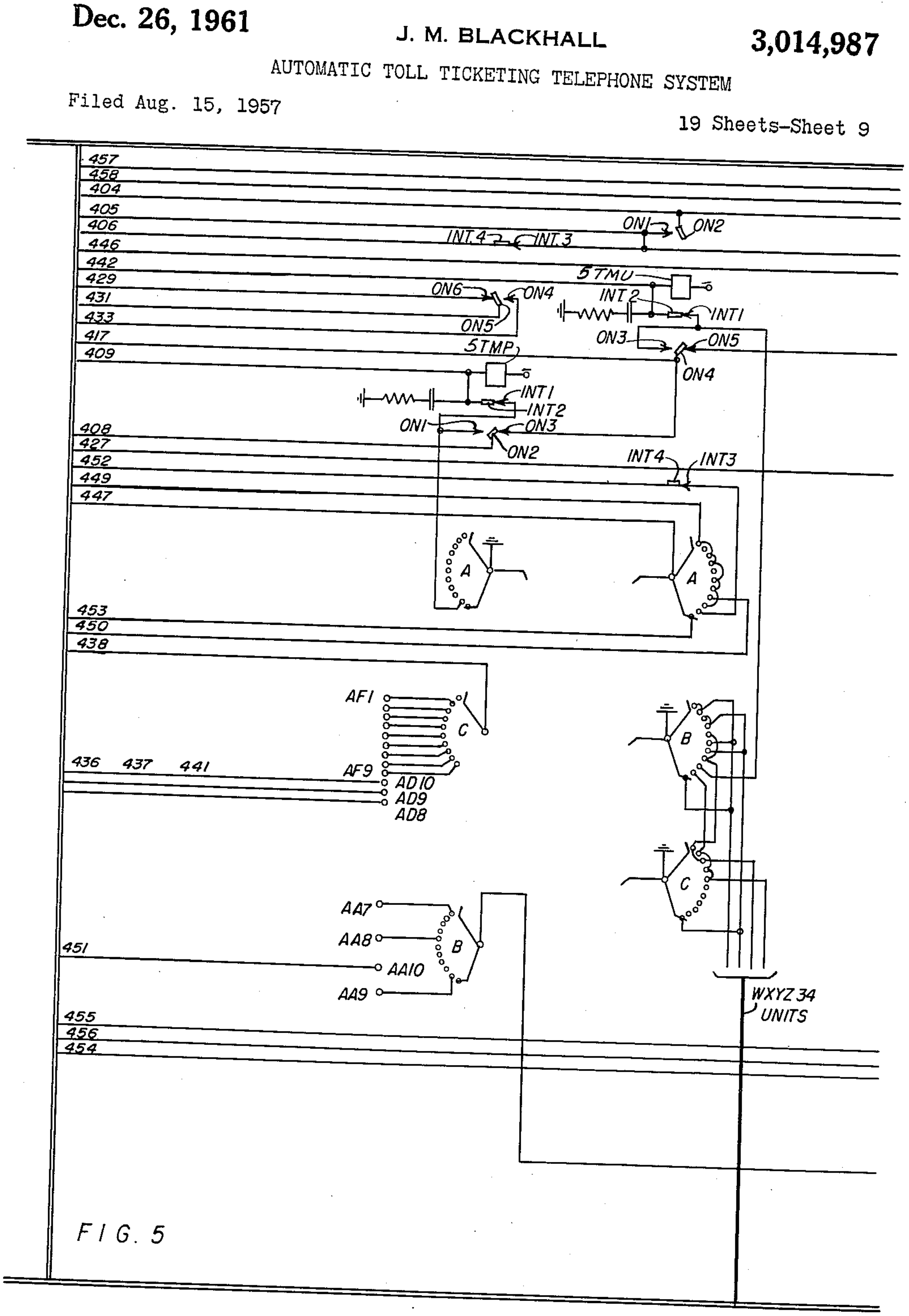
Figure 6:
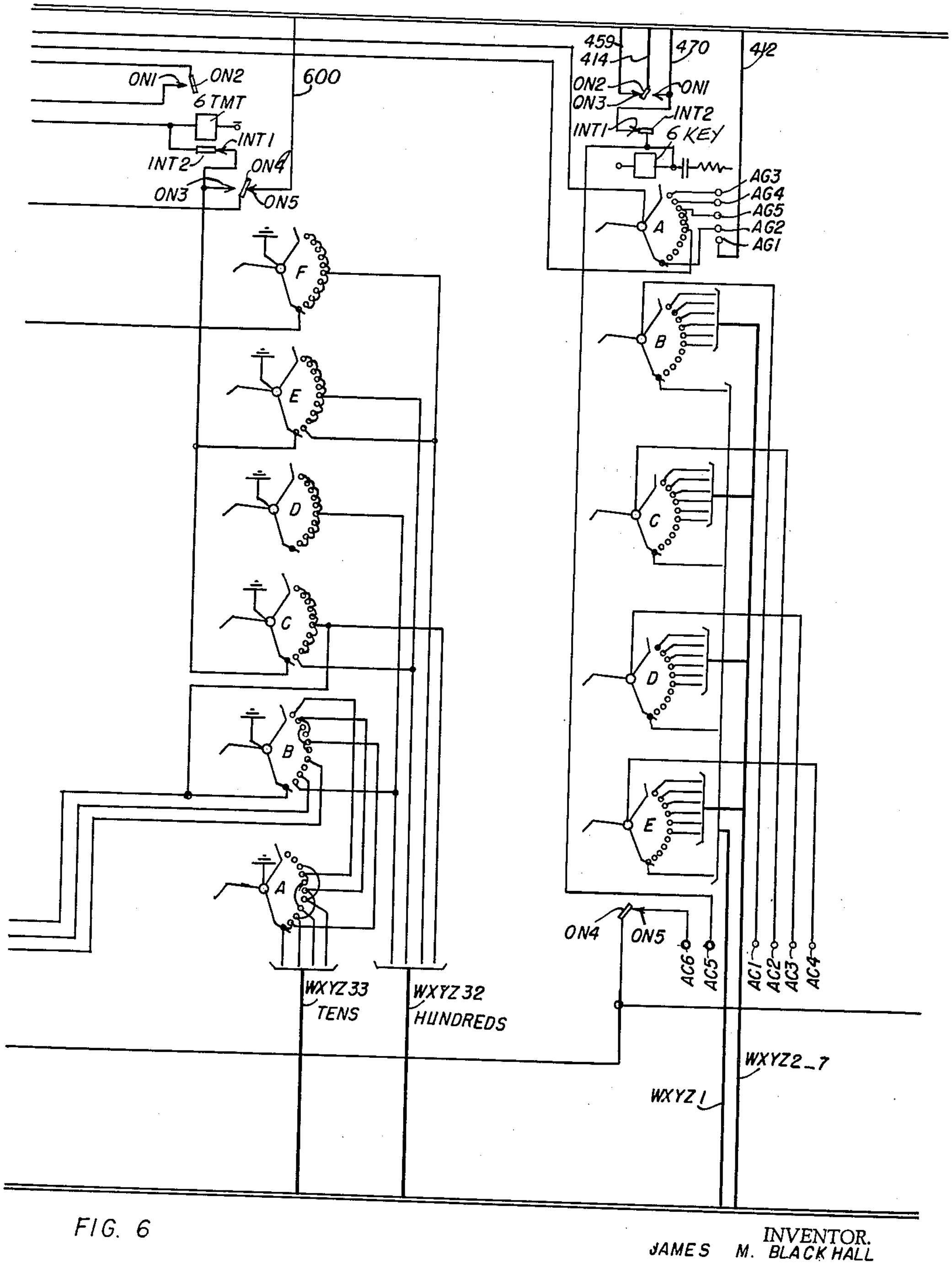
Figure 7:
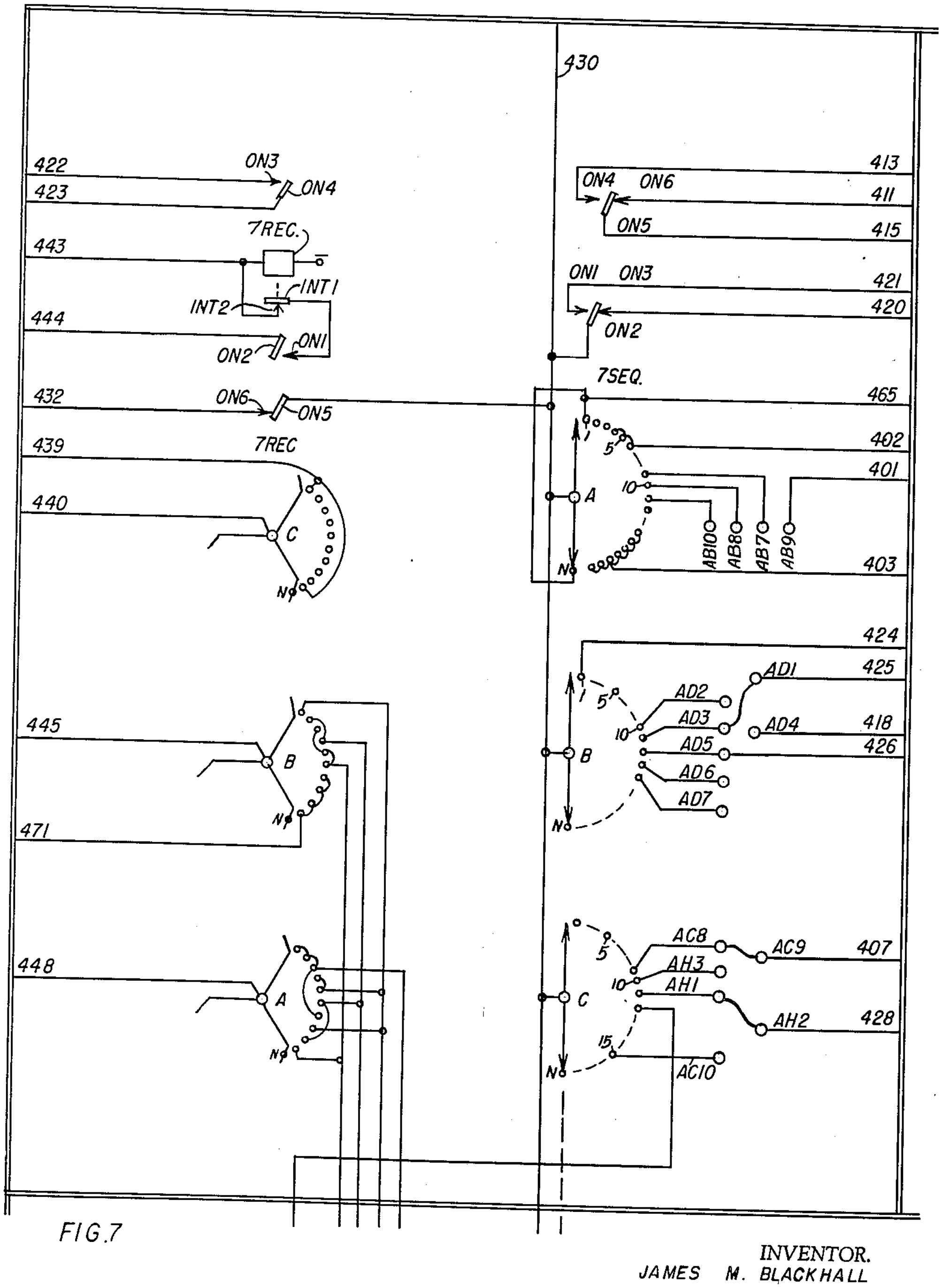
Figure 7A:
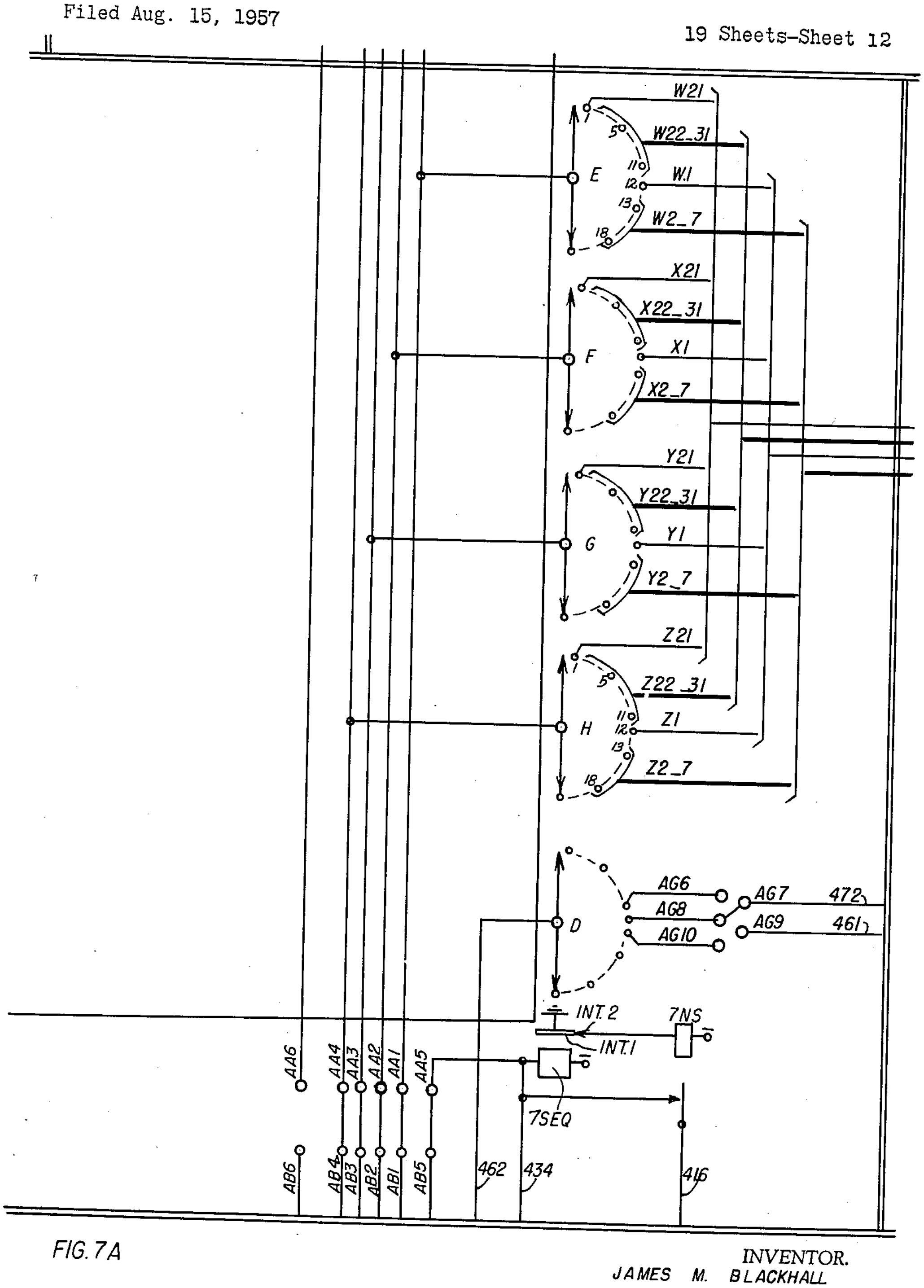
Figure 8:
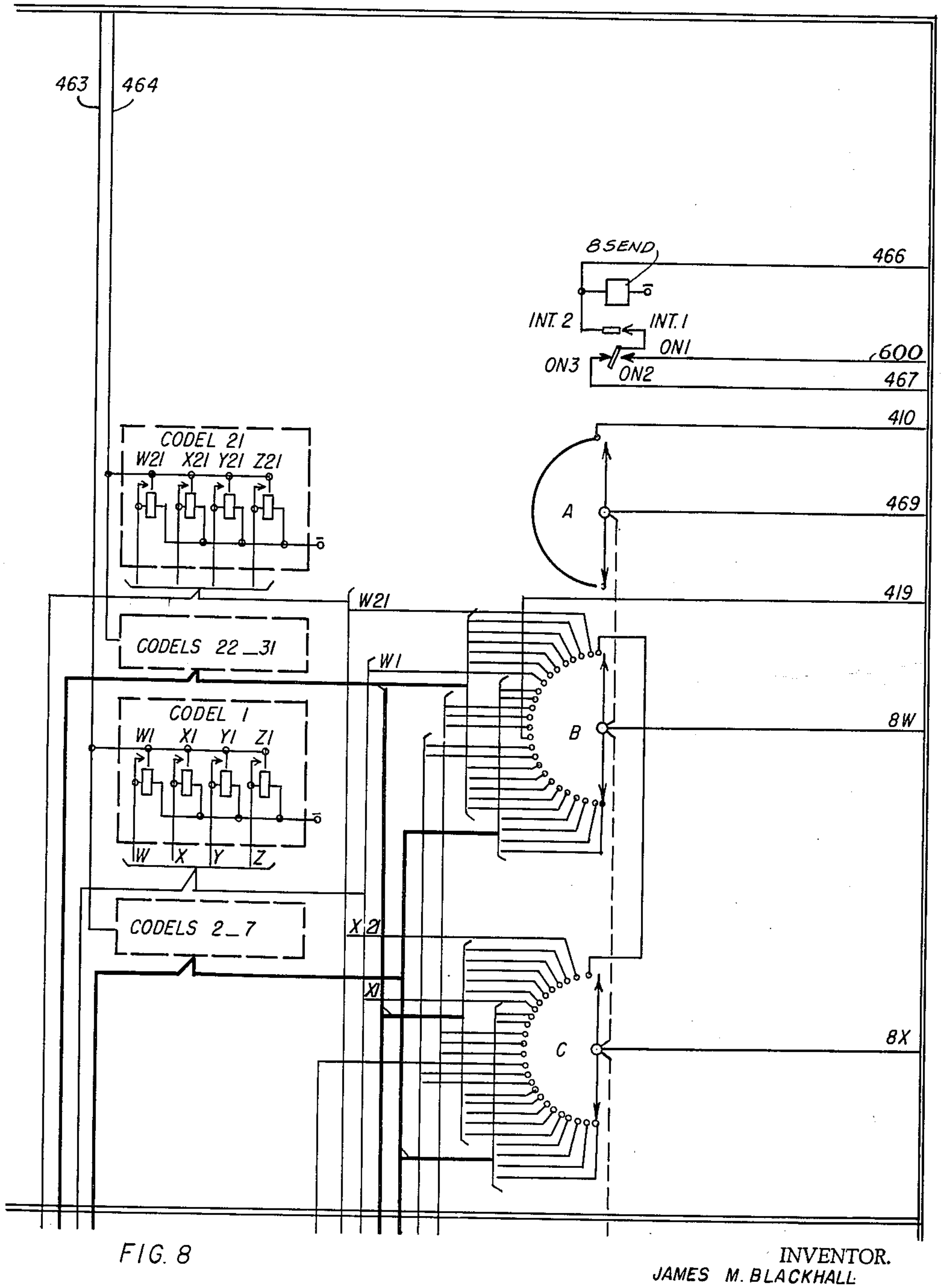
Figure 8A:
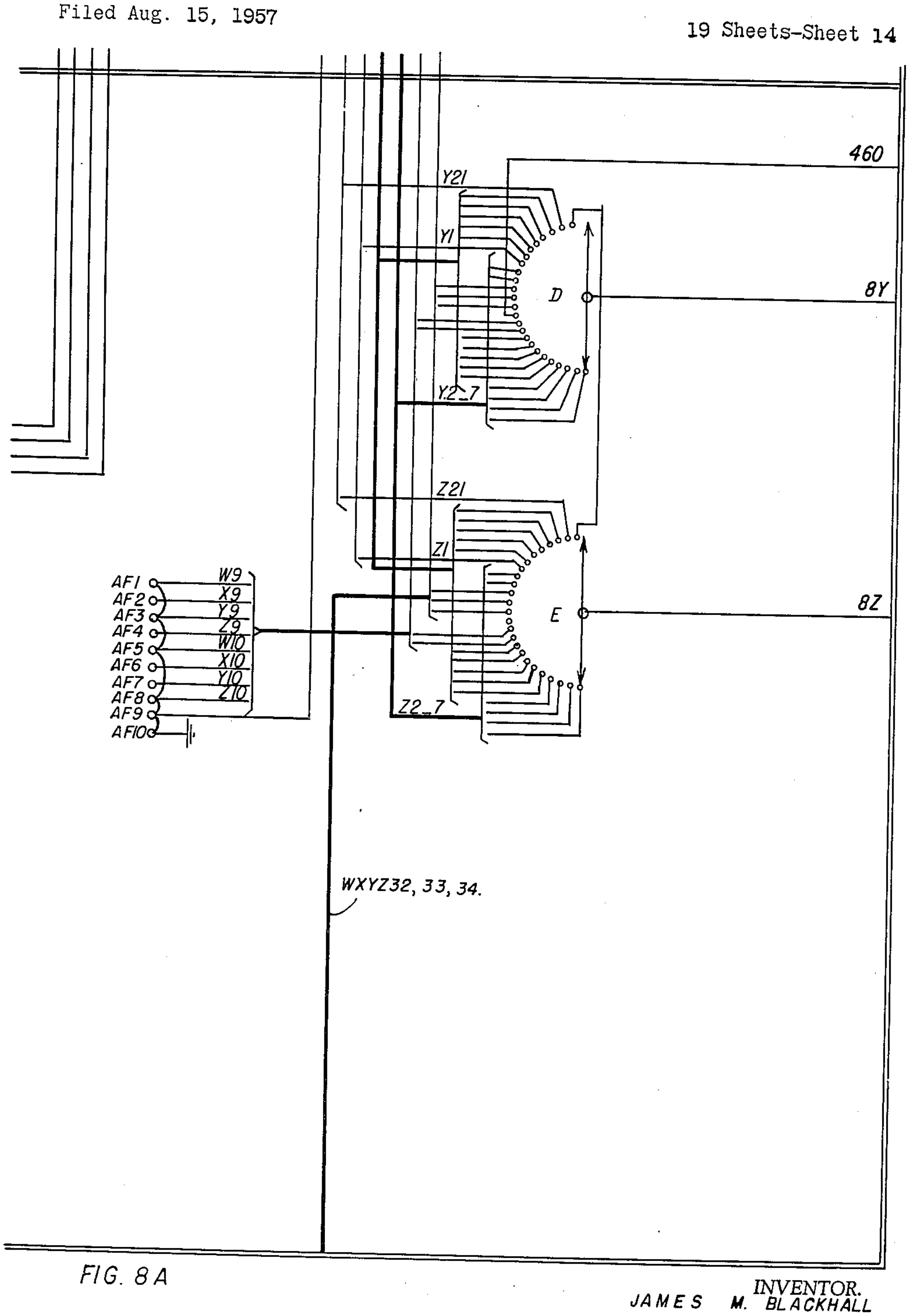

FIG. 14, illustrates the manner of combining FIGS. 1 to 13 inclusive of the drawings to form a unified system.

DETAILED OPERATION

*Seizure from local selector-local access calls*

When the calling subscriber at station 13SS1 removes his receiver, the usual loop circuit, including the line conductors 13T and 13R is completed for operating the line circuit 13L. In response to the completion of the above mentioned loop circuit, the line circuit 13L initiates operation of the distributor and marks the terminals of the calling subscriber line in the bank contacts of a group of line finders, including the line finder 13F, having access to the calling subscriber line. For the purpose of this description it will be assumed that the distributor selects the line finder 13F and that the latter finder operates its wiper in a vertical and then in a rotary direction in a well-known manner to select the terminals in the associated bank terminating the calling line. When the calling line is found by the line finder 13F, it extends the calling line to the individually associated first selector 13S1 and the latter selector transmits the usual dial tone signal to the calling subscriber to indicate that the dialling may be started. The above noted switching apparatus, including the line circuit 13L, the distributor, the line finder 13F and the first selector 13S1 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 13S intends to extend the connection to a called subscriber in a remote exchange it is necessary to prefix the directory number of the called subscriber with the access code digit "9." Consequently, when the calling subscriber received the dialling tone signal the dial is actuated in accordance with the digit 9 to transmit nine loop impulses to the first selector 13S1. This selector then raises its wipers in a vertical direction to the ninth level and then rotates its wipers over the selected level to search for an idle ticketer, such as the ticketer of FIGS. 1–8A. It will be assumed for the purpose of this description that the first selector 13S1 now extends the connection from the calling subscriber line by way of the cable to the ticketer illustrated in FIGS. 1 to 8A, inclusive. The cable includes the "−" conductors 1TL, the "+" conductor 1RL and the control conductor 1CL. If the ticketer is busy, the control conductor will be grounded in order to indicate the busy condition to the first selector 13S1. Thus, as the selector rotates its wipers over the ninth level it will pass over contacts terminating ticketers having grounded control conductors corresponding to the 1CL conductor.

*Seizure of ticketer*

Resistance battery on lead 1CU through break contacts 2BC4T, 1BA2T, 1BB4T through the number 2 winding of relay 1CA marks this circuit idle to preceding selector circuits. When seized, ground is forwarded over lead 1CU to the number 2 winding of relay 1CA and a loop circuit is closed. When the loop circuit is switched through, the tip side, (+L) is closed through the number 2 winding of relay 1AA through break contacts 2EN7T to ground and the ring side is closed through the number 1 winding of relay 1BF in series with the number 1 winding of relay 1AA to battery for lead −L. Relay 1CA operates and prepares a path to relay 1CB. Relay 1AA operates and closes a circuit to relay 1BA, relay 1BA operates, closes resistance ground through the number 1 winding of relay 2CA and lead 1CU to hold the preceding equipment, shorts the number 1 winding of relay 1BF, closes ground to the relay 2BS, the number 1 winding of relay 2AN, and relay 1CB closes direct ground to light the ticketer monitor lamp, opens the number 2 winding of relay 1CA, and closes ground to leads 1 and 2 of the impulse generator. If this circuit is seized over leads +L and −L, relay 1BF operates in series with relay 1AA, it locks through the number 2 winding of relay 1BF when relay 1BA operates, and closes ground over lead 1PD to the ticketer selector circuit. The ticketer monitor lamp lights brightly to indicate that the ticketer has been seized.

Relay 1CB operates. Relay 2AN operates, closes ground to the release alarm and closes lead CTP to the number 1 winding of relay 4TP. Relay 2BS operates, removes ground from lead 1 to start the impulse generator, and closes ground to the number 2 winding of relay 1CA (relay 1CA is slow-to-release and did not restore when relay 1BA operated).

If the circuit is arranged for registration upon seizure, ground will be closed to the rotary switch magnet 7SEQ when relay 2BS operates. Switch 7SEQ operates its interrupter springs and closes ground to relay 7NS. Relay 7NS operates and at contacts 7NS2 opens the operating path to magnet 7SEQ. Switch 7SEQ restores, opens the circuit at its interrupter contacts to relay 7NS, steps to bank terminal 1, and operates its off-normal springs 4 and 5 to close ground to the number 1 winding of relay 1BB from the make springs 2BS6T break springs 1BB2B, lead 415, rotary switch 7SEQ, off-normal springs 5 and 4 through make springs 2BS4B to relay 1BB. Relay 7NS restores. Relay 1BB operates, locks to the number 2 winding, opens a number 1 winding, removes ground from lead ATB, and grounds the level A wipers of rotary switch 8SEND from ground at make contacts 1BB4B lead 469 to wiper level A of switch 8SEND.

*Dialling the called number*

This ticketer can be arranged for various operating options, which are determined by means of strap wiring, for use with a 6–7, 7, or 7–8 digit toll system.

*Dialling digit A of the office code*

Relay 1AA follows the dial pulses of digit A. As relay 1AA restores on the first pulse, it closes ground to the number 1 winding of relay 1CA and rotary switch magnet 7REC, and opens the circuit to relay 1BA when relay 1AR reoperates, ground is removed from the number 1 winding of relay 1CA and from the magnet 7REC, and is closed to relay 1BA. Switch 7REC restores, steps, and operates its off-normal springs to open the circuit to the number 2 winding of relay 1CA. Relay 1BA and 1CA are slow-to-release and remain operated for the duration of the digit. Magnet 7SEQ operates but switch 7SEQ is an indirect drive switch and does not advance its wipers at this time.

At the end of the digit, relay 1CA restores and opens the circuit to relay 1CB. Relay 1CB is slow-to-release and does not restore immediately. During the interval of time when relay 1CA is restored and relay 1CB remains reoperated, ground is closed through the level A and B wipers of switch 7REC and levels E, F, G and H wipers of switch 7SEQ to codel storage relays in code relay register group 21.

The different combination of codel register relays which operate will depend on the digit dialled. The codel relay combination and their decimal equivalents are given in the following table:

| | | | |
|---|---|---|---|
| WX | 1 | YZ | 6 |
| WY | 2 | W | 7 |
| WZ | 3 | X | 8 |
| XY | 4 | Y | 9 |
| XZ | 5 | Z | 0 |

As the various W, X, Y and Z codel relays in codel relay register group 21 operate and lock, they close ground to the corresponding bank terminals of switches 7SEQ and 8SEND. When relay 1SB restores, it opens the circuit to rotary switch magnet 7SEQ and close the "homing" circuit to rotary switch 7REC. Switch 7SEQ restores and advances its wipers to bank terminal number 2 and prepares a circuit to codel relay group 22. Switch 7REC "homes" to normal and closes ground to the number 2 winding of relay 1CA. Relay 1CA operates and closes a circuit to relay 1CB. Relay 1CB operates.

If there is no registration upon seizure, the first digit into this circuit will be part of the access code and will be absorbed as follows: The operation will be as described above for digit A of the office code except switch 7SEQ will be at normal and the digit will not be started. The second digit will then be digit A of the office code.

*Dialling digit B of the office code*

Relay 1AA follows the dial pulses of digit B. The cycle of operation for relay 1AA, 1CA and 1CB and switches 7REC and 7SEQ during dialling is the same as for digit A of the office code.

At the end of the digit the codel relays in codel relay register group 22 operate and lock to store digit B of the office code, switch 7SEQ advances to bank terminal 3, switch 7REC "homes" and relays 1CA and 1CB reoperate.

*Dialling digit C of the office code or the first terminal digit*

When this ticketer is used by a 6 or 6–7 toll system, there will be only 2 office code digits, however, the first terminal digit for this system will be received and stored in the same manner as digit C of the office code in the 7, or 7–8 digit system. Relay 1AA follows the pulses of this digit. The cycle of operation for relays 1AA, 1CA and 1CB and switches 7REC, 7SEQ during the dialling is the same as for digit A of the office code.

At the end of the digit the codel relays in codel relay register group 23 operate and lock to store this digit, switch 7SEQ advances to bank terminal 4, switch 7REC "homes" and relays 1CA and 1CB reoperate. Unless this is a long haul call (additional 3 digit area code), ground is closed to magnet 7SEQ through the level A wipers when switch 7SEQ steps to bank terminal number 4. Magnet 7SEQ operates and closes ground through its interrupter springs to relay 7NS. Relay 7NS operates and opens the circuit to magnet 7SEQ. Switch 7SEQ restores, steps, and restores its interrupter springs to open the circuit to relay 7NS. Relay 7NS restores. Switch 7SEQ steps, interrupted by relay 7NS, to bank terminal number 7.

*Dialling the terminal digit*

DIALLING THE TERMINAL DIGIT FOR A 6–7 DIGIT SYSTEM

The first terminal digit was discussed in the previous section. Relay 1AA follows the dial pulses of the next three terminal digits. The cycle of operations for relays 1AA, 1CA and 1CB, and switches 7REC and 7SEQ for each terminal digit is the same as for digit A of the office code. The second, third and fourth terminal digits are stored on codel relay register groups 27, 28 and 29 respectively.

After the sixth digit (fourth terminal digit) is dialled, switch 7SEQ steps to bank terminal 10. Should the called number be seven digits, the seventh digit (fifth terminal digit) is stored on codel group 30 and switch 7SEQ will step to bank terminal 4 after the digit. When the rotary switch 7SEQ steps to bank terminal 10 ground is closed from contact 1BA9 through the level C wipers to relay 2MB. Relay 2MB operates, locks and closes the "homing" circuit to rotary switch 5TMP. Switch 5TMP is concerned with the timing intervals for dialling and is discussed in a succeeding section. Switch 5TMP "homes" to normal and closes a circuit to relay 2MC.

Relay 2MC operates, locks, and opens the "homing" circuit of switch 5TMP. If the seventh digit is not dialled within a prescribed time interval (5TMP times the interval, strapping on its banks determines the length of the interval), ground is closed from contact 1BA9 through the level C wipers of switch 5TMP to relay 4LT. Relay 4LT operates, locks, closes the "homing" circuit to 5TMP, opens the circuit to the number 1 winding of relay 2AN, and closes ground to rotary switch magnet 7SEQ. Switch 5TMP "homes" to normal. Relay 2AN restores, opens lead CTP from relay 4TP, and opens relays 4TC and 4TD (these relays are used in dial timing). Relays 4TP, 4TC and 4TD restore. Switch 7SEQ steps interrupted by relay 7NS, to bank terminal 12 and closes grounds through its level B wipers to the number 1 winding of relays 2DE and 3SE (if translation is provided).

In the case of a seven digit number, the switch 7SEQ steps to bank terminal 11 (1CA restored and 1CB still operated) and closes ground to 4LD. Relay 4LD operates, locks, and opens the circuit to the number 2 winding of relay 1CA to prevent its reoperation. Relay 1CB restores and closes the "homing" circuit to switch 5TMP. Switch 5TMP "homes" to normal and, in so doing, closes ground to its level C wipers to relay 4LT. Relay 4LT operates as described previously to open the number 1 winding of relay 2AN and closes ground to magnet 7SEQ. Relay 2AN, 4TP, 4TC, and 4TD restore. Switch 7SEQ steps to bank terminal 12 and closes ground through its level B wipers to the number 1 winding of relay 2DE and relay 3SE.

Relays 2DE and 3SE call for the "D" operator and coder-codexer as described in the succeeding sections.

DIALLING THE TERMINAL DIGIT FOR A 7 DIGIT SYSTEM

Relay 1AA follows the dial pulses of the four terminal digits. The cycle of operation for relays 1AA, 1CA and 1CB, and switches 7REC and 7SEQ for each terminal digit is the same as for digit A of the office code described in the preceding section. The first, second, third and fourth terminal digits are stored on codel register groups 27, 28, 29 and 30, respectively.

After the seventh digit (four terminal digit) is dialled, switch 7SEQ steps to bank terminal 11 and closes ground through its level C wipers to relay 7MB and through its level B wipers to magnet 7SEQ. Relay 2MB operates, locks, and closes the "homing" circuit to rotary switch 5TMP. Switch 7SEQ steps, interrupted by relay 7NS, to bank terminal 12 and closes ground through its level B wipers to a number 1 winding of relay 2DE and 3SE. Switch 5TMP "homes" to normal and closes a circuit to relay 2MC. Relay 2MC operates, locks, and opens the "homing" circuit of switch 5TMP. Relay 2DE operates and opens the circuit to the number 1 winding of relay 2AN. Further functions of relay 2DE are described in the section entitled "Calling for the operator." Relay 2AN restores, opens lead CTP to relay 4TP, and opens a circuit to relay 4TC and 4TD. Relay 4TP, 4TC and 4TD restore.

DIALLING THE TERMINAL DIGIT FOR A 7–8 DIGIT SYSTEM

Relay 1AA follows the dial pulses of the first four terminal digits. The cycle of operation of relays 1AA, 1CA, 1CB and switches 7REC and 7SEQ for each terminal digit is the same as for digit A of the office code in the preceding section. The first, second, third and fourth terminal digits are stored in codel register groups 27, 28, 29 and 30, respectively.

After the seventh digit (four terminal digit) is dialled, switch 7SEQ steps to bank terminal 11. Should the called number be eight digits the eighth digit (fifth terminal digit) is stored on codel register group 31 and switch 7SEQ will step to bank terminal 12 for the digit. The operation and timing for the 7–8 digit system is the same as for the 6–7 digit system, except that strapping is changed so that relays 2MB and 2MC operate when switch 7SEQ steps to bank terminal 11 instead of 10 and thus the switch 7SEQ is advanced one step with this system. When the rotary switch 7SEQ advances to bank terminal 12, with the eight digit or the operation of relay 4LT, ground will be closed to the number 1 winding of relay 2DE and 3SE.

*Determining the called number for 10 or 11 digit calls*

On a 10 or 11 digit call, the first three digits constitute the area code, of which the second digit is 1 or 0; the second three digits constitute the ABC office code; and the last 4 or 5 digits constitute the terminal digits.

*Dialling first digit of area code*

Relay 1AA follows the dial pulses of the first digit of the area code. The cycle of operation for relays 1AA, 1CA and 1CB, and switches 7REC and 7SEQ during dialling is the same as for digit A of the office code in the preceding section. At the end of the digit, the codel relays in codel register group 21 operate and lock to store the first digit of the area code, switch 7SEQ advances to band terminal number 2, switch 7REC "homes" and relays 1CA and 1CB reoperate.

*Dialling a second digit of area code*

Relay 1AA follows the dial pulses of the second digit of the area code. The cycle of operation for relays 1AA, 1CA, and 1CB, and switches 7REC and 7SEQ during the dialling is the same as in the preceding section. At the end of the digit, relay 1CA has restored and relay 1CB is still operated, ground is closed through level A wipers of switch 7SEQ and the level C wipers of switch 7REC to relay 4LH. Relay 4LH operates, closes ground to bank terminal 14, level B of switch 8SEND, and opens the path which steps switch 7SEQ over bank terminals 4, 5 and 6 on short haul calls. The codel relays in codel register group 22 operate and lock to store the second digit of the area code, switch 7SEQ advances to bank terminal 3, switch 7REC "homes" and relays 1CA and 1CB reoperate.

*Dialling thrid digit of area code*

Relay 1AA follows the dial pulses of a third digit of an area code. The cycle of operation for relays 1AA, 1CA and 1CB, and switches 7REC and 7SEQ during dialling is the same as described in the preceding sections. At the end of the digit, the codel relays in codel register group 23 operate and lock to register the third digit of the area code, switch 7SEQ advances to bank terminal 4, switch 7REC "homes" and relays 1CA and 1CB reoperate.

*Dialling ABC office code and terminal digits*

Relay 1AA follows the dial pulses of the office code and terminal digits. The cycle of operation for relays 1AA, 1CA and 1CB, and switches 7REC and 7SEQ for each digit is the same as for digit A of the office code in the preceding sections. The ABC office code and the four terminal digits for 10 digit calls are stored in the codel register groups as follows:

| | |
|---|---|
| Office code digit A | Codel 24 |
| Office code digit B | Codel 25 |
| Office Code digit C | Codel 26 |
| First terminal digit | Codel 27 |
| Second terminal digit | Codel 28 |
| Third terminal digit | Codel 29 |
| Fourth terminal digit | Codel 30 |

After dialling the tenth digit (fourth terminal digit) of the called number, switch 7SEQ steps to bank terminal 11. Should the call be an 11 digit call, the eleventh digit (fifth terminal digit) is stored on codel register group 31 and switch 7SEQ will step to bank terminal 12 after the eleventh digit.

*Dial timing*

When relay 2AN operated on seizure, it closed lead CTP to the number 1 winding of relay 4TP. Relay 4TP follows the 60 interruptions per minute ground pulses from lead CTP. On the first pulse, relay 4TP operates and closes the circuit to relay 4TD. Relay 4TD operates and locks from its own contacts in series with the number 1 winding of relay 4TC. When 4TP restores at the end of the first pulse, the short is removed from the number 2 winding of relay 4TC. Relay 4TC operates, opens lead release alarm and closes the ground pulses of relay 4TP through the number 1 winding of relay 4TC to magnet 5TMP. Rotary switch 5TMP steps once each second from ground pulses of relay 5TP and also steps self-interrupted over bank terminal 10, level A.

If the required number of digits in the called number are dialled before the allotted time expires relay 2MB operates and closes the "homing" circuit of switch 5TMP. Switch 5TMP "homes" to normal and continues following the ground pulses of relay 4TP (except in the 7 digit system). After a second timed interval, during which the seventh digit in a 6–7 digit toll system or the eighth or the eleventh digit in a 7–8 digit toll system may be dialled, ground is closed through level C wipers of switch 5TMP to relay 4LT. If the extra digit is not dialled relay 4LT operates, closes the "homing" circuit of switch 5TMP, opens the circuit to the number 1 winding of relay 2AN, and closes switch 7SEQ to step to bank terminal 12. If the extra digit is dialled during this time interval, the "homing" circuit will be closed by the operation of relay 4LD and restoring of relay 1CB. Switch 5TMP "homes" to normal and in the latter case, in so doing, closes ground to relay 4LT. Relay 4LT operates and opens the circuit to the number 1 winding of relay 2AN. When relay 2AN restores, lead CTP is opened from the number 1 winding of relay 4TP and ground is removed from the number 2 winding of relay 4TC and 4TD. Relay 4TP, 4TC and 4TD restore.

If the required number of digits in the called number are not dialled before the allotted time expires, ground will be closed through the level B wipers of switch 5TMP to relay 4LT. Relay 4LT operates, closes the "homing" circuit to switch 5TMP and opens the circuit to the number 1 winding of relay 2AN. Relay 2AN restores, opens lead CTP from the number 1 winding of relay 4TP and opens the circuit to the number 2 winding of relay 4TC and 4TD. Relays 4TP, 4TC and 4TD restore.

If the timed out call is to terminate in a busy tone the ticketer is strapped so that when relay 4LT operates (with relay 2MC not operated), ground will be closed to the number 1 winding of relay 2BC. Relay 2BC operates, looks, closes direct ground to lead CU, and returns busy tone to the calling subscriber. The ticketer remains thus operated until the calling party disconnects.

If the call is to be routed to an operator, the ticketer is strapped so that when relay 4LT operates, ground is closed to the rotary switch magnet 7SEQ. Switch 7SEQ, steps, interrupted by relay 7NS, to bank terminal 12 and closes a circuit to the number 1 winding of relay 2DE. Relay 2DE operates and the operator is called for and closed through to the subscriber as described in the succeeding section. Since relay 2MC is not operated, the "pilot" lamp at the operator's position remains bright. The operator now handles the call.

*Calling for the operator*

When the switch 7SEQ stepped to bank contact 12, ground is also closed to the number 1 winding of relay 2DB. If translation is provided, ground is also closed to relay 3SE. The coder-codexer will be called and translation occurs while the operator's operations are taking place as described in one of the following sections.

Relay 2DE operates, closes ground through a lead 10ST to cause the operator allotter circuit to hunt for an idle operator trunk circuit, removes ground from 10H to mark this as a calling ticketer, closes ground through lead WLP to light the "wait" lamp at the operator's position to indicate a call requiring service, closes ground to the number 2 winding of relay 2DE, opens a circuit to the number 1 winding of relay 2DE, removes ground from switch 7SEQ (except in the case of the seven digit system), and closes a circuit to the number 1 winding of relay 2DA through lead 10P to the operator trunk circuit.

When the operator allotter circuit has found an idle operator trunk circuit and the operator trunk circuit finds the calling ticketer, ground is closed through lead 10P to the number 1 winding of relay 2DA. Relay 2DA operates, locks to its number 2 winding, removes ground from lead 1WLP to extinguish the "wait" lamp at the operator's position, opens the circuit to the number 2 winding of relay 2DE, opens the operating path of the number 1 winding of relay 2DE, and closes resistance ground through resistor 2R1 and 10L to the "pilot" lamp at the operator's position. The "pilot" lamp lights dimly to indicate the call is being processed. Relay 2DE restores, removes ground from lead 10ST to the operator allotter circuit, returns ground to lead 10H to mark this ticketer busy, opens the circuit to the number 1 winding of relay 2DA, and closes ground to lead 10P to the number 1 winding of relay 3DE and 3DG. Relay 3DF operates and locks through the number 2 winding. Relay 3DG operates. The operator trunk circuit will generate a zip-zip tone upon connection with the ticketer and then remove ground from lead 10P. Relay 3DG restores and closes a circuit to the number 1 winding of relay 3DB. Relay 3DB operates, closes direct ground to lead 10L to light the "pilot" lamp brightly, closes a circuit to the number 1 winding of relay 3DC and 3DG. Relay 3DC operates, locks through the number 2 winding and reverses battery to the line to check for the origin of the call. If this call is from a paystation, paystation tone is closed to the number 1 winding of relay 2CS through lead CU. This tone is induced in the number 2 winding of relay 2CS and closed to leads 10T and 10R and + and − then reverses. Relay 3DG operates and opens a circuit to relay 3DB. Relay 3DB restores and opens a circuit to relay 3DG. Relay 3DG restores and closes a circuit to the number 1 winding of relay 3DD and the number 1 winding of relay 3DB. Relay 3DD operates and locks through the number 2 winding of relay 3DD. Relay 3DB operates and closes a circuit to relay 3DG. Relay 3DG operates and opens a circuit to the number 2 winding of relay 3DF and the number 1 winding of relay 3DB. Relay 3DF restores. Relay 3DB restores, closes resistance ground to lead 10L to determine the "pilot" lamp and opens a circuit to relay 3DG. Relay 3DG restores and opens the circuit to relay 3DD and 3DC. Relay 3DD restores. Relay 3DC restores and returns the line polarity to normal. The operator, after hearing the zip-zip tone will wait for the "pilot" lamp to dim which tells her the ticketer is ready to accept keying operations and has connected her headset through to the subscriber.

*Keying in the calling number*

The operator receives the calling number verbally and repeats it to the ticketer through the operator's trunk circuit as grounds on leads 80W, 80X, 80Y and 80Z. With translation provided, the switch 6KEY in the ticketer is used to receive the digits. If the ticketer is arranged to operate without translation, the switch 6KEY receives the digits if sending is to start with the operation of the operator's accept key, and the switch 7SEQ receives the digits if sending starts with the operation of the operator's start key.

*Keying into switch 7SEQ*

When the operator keys in the digits as ground on the leads 80W, 80X, 80Y and 80Z the grounds are closed through the respective levels E, F, G, and H of switch 7SEQ to the codel relays in codels 1–7. As each digit is sent by the operator, ground is also closed through lead 80M to magnet 7SEQ. The magnet 7SEQ operates. When ground is removed from lead 80M at the end of each digit, switch 7SEQ restores and steps its wipers to the next bank terminal. If the calling number is not seven numbers, ground from contact 1BA9 (when relay 3DB operated as explained in section entitled "Calling for the operator"), causes switch 7SEQ to step, interrupted by relay 7NS, to bank terminal 13 for a six digit, terminal 14 for a 5 digit and terminal 15 for a 4 digit calling number and closes ground to the level B wipers of switch 7SEQ in the number 1 winding relay 3DC. When the operator finishes keying in the calling number, she depresses a start key to close ground through lead 10S and the number 1 winding of relay 2MD to resistance battery. Should the operator depress her start key before the required number of digits have been keyed into the ticketer, the number 1 winding of relay 2MD is shorted by ground on the level A wipers of switch 7SEQ and start key is immobilized. Relay 2MD operates, locks through its number 2 winding, removes ground from lead 10L to extinguish the "pilot" lamp at the operator's position and release the operator trunk circuit, and closes ground to magnet 7SEQ. Switch 7SEQ steps, interrupted by relay 7NS, to bank terminal 1 and closes ground through its level B wipers to the number 1 winding of relay 3DC to start the sending operations.

*Keying into switch 6KEY*

When the operator keys in the digits as grounds on leads 80W, 80X, 80Y and 80Z, the grounds are closed through the respective levels B, C, D and E of switch 6KEY to codel relays of codels 1–7. As each digit is sent by the operator, ground is also closed through lead 80M to magnet 6KEY. The magnet 6KEY operates. When ground is removed from lead 80M at the end of each digit, switch 6KEY restores and steps its wipers to the next bank terminal.

If the calling number is not seven numbers, ground from the level A wipers (when relay 3DC operates) cause switch 6KEY to step, self-interrupted, to bank terminal 1 for a six digit, terminal 2 for a five digit, and terminal 3 for a four digit calling number.

It should be noted that codel register group 1 is strapped to bank terminal N and switch 6KEY does not step before the first digit if the calling number consists of seven digits.

When the operator finishes keying in the calling number, she depresses the start key to close ground to lead 10S and the number 1 winding of relay 2MB to resistance battery. Should the operator depress her start key before the required number of digits have been keyed into the ticketer, the number 1 winding of relay 2MD is shorted by ground on level A wipers of switch 6KEY, and the start key is immobilized. Relay 2MD operates, locks through the number 2 winding, and removes ground from lead 10L to extinguish the "pilot" lamp at the operator's position and releases the operator's trunk circuit, and closes the "homing" circuit to switch 6KEY. Switch 6KEY "homes" to normal.

*Use of error key*

If, during the course of keying operations, the operator actuates the error key, ground is closed through lead 10E to the number 1 winding of relay 3DB. Relay 3DB operates, closes direct ground to lead 10L to brighten the "pilot" lamp, closes ground to relay 3DG, removes holding ground from codels 1–7, and closes ground to either switch 7SEQ, or 6KEY, depending upon which switch is associated with the keying operations. Any relays in codels 1–7 that have been operated will restore. Relay 3DG operates.

If switch 7SEQ is used for keying, it will step, interrupted by relay 7NS, to normal and continue stepping to bank terminal 12, 13, 14 or 15, or it closes ground through the level B wipers to the number 1 winding of relay 3DC. Relay 3DC operates, opens the circuit to the number 1 winding of relay 3DB and to the number 2 winding, and opens the operating path of switch 7SEQ. Relay 3DB restores, opens the circuit to the number 1 winding of relay 3DC, opens the circuit to relay 3DG and dims the "pilot" lamp by placing resistor 2R1 in series with lead 10L. Relay 3DC restores, closes lead 10E to the number 1 winding of relay 3DB and returns the line polarity to normal. Relay 3DG restores.

If switch 6KEY was used for keying, it will step self-interrupted to normal and close ground through its off-normal springs to the number 1 winding of relay 3DC. Relay 3DC operates, opens the circuit to the number 1 and 2 windings of relay 3DB, opens the "homing" path of switch 6KEY, and closes the level A wipers to magnet 6KEY for presetting, if the calling number is other than six digits. Relay 3DB restores, opens the circuit to the number 1 winding of relay 3DC, and opens the circuit to relay 3DG, and dims the "pilot" lamp by placing resistor 2R1 in series with lead 10L. Relay 3DC restores, closes lead 10E to the number 1 winding of relay 3DB, and returns the line polarity to normal. Relay 3DG restores.

The error key may be depressed before keying operations begin to re-check for paystation tone. Relay 3DC will operate as above and reverse the line polarity.

*Withdrawal of the operator*

If the operator should experience difficulty or for any reason wish to release this call, the start key and error key are depressed simultaneously. Relay 3DB operates from ground on lead 10E, closes a circuit to relay 3DG, removes a holding ground from codels 1–7 and closes ground to either switch 7SEQ or 6KEY, depending on which is associated with the keying operation. Relay 3MD operates from ground on lead 10S (relay 3DB removes shunting ground from the level A wipers of switch 7SEQ or 6KEY), locks, closes locking ground to the number 2 winding of relay 3DB, and removes ground from lead 10L to extinguish the "pilot" lamp and release the operator trunk circuit.

Switch 7SEQ steps to bank terminal 12 or switch 6KEY steps to normal and closes a circuit to the number 1 winding of relay 3DC. Relay 3DC operates, opens the operating path of the stepping switch, and closes ground to the number 1 winding of relay 2BC. Relay 2BC operates, closes busy tone to the subscriber, opens the circuit to relay 3SA, and the number 1 winding of relay 3SB, the windings of relay 4PA and the impulse generator (if they are operated). Relays 3SA, 3SP and 4PA restore. Relay 3DG operates. The ticketer remains operated until the calling party disconnects.

*Translation*

After the last digit of the called number is dialled into the ticketer, switch 7SEQ stepped to bank terminal 12 and closes ground through its level B wipers to relay 3SE. Relay 3SE operates, closes ground over lead CST to the coder-codexer allotter circuit, removes ground from lead CH to mark this as the calling ticketer, and locks to the number 2 winding of relay 3SE. When the coder-codexer ticketer hunter circuit recognizes the calling ticketer from absence of ground on lead CH, high resistance ground is closed through lead CP to relay 3SA and the number 1 winding of relay 3SB. Relay 3SA operates, open the number 1 winding of relay 3SE, and closes ground to magnet 7SEQ. Switch 7SEQ steps, interrupted by relay 7NS, to bank terminal 1 and closes ground through its level B wipers to the number 1 winding of relay 3PC.

Relay 3PC operates, locks through its number 2 winding, opens the number 1 winding, closes a circuit to relay 3PD, prepares a circuit to the number 1 and the number 2 windings of relay 4PA in series, closes a circuit to the number 2 winding of relay 1CA (if it is not operated) and opens the operating path of switch 7SEQ. Relay 1CA operates and closes a circuit to relay 1CB. Relay 1CB operates. Relay 4PA operates only its "X" contacts on ground pulses from the impulse generator (which started with the operation of relay 2MB) through the number 2 winding of relay 4PA. on the succeeding pulses of the "X" contacts of relay 4PA after the operation of relay 3PC, ground and closed through the number 1 winding of relay 4PA and the number 2 winding of relay 4PA in series. Relay 4PA operates fully and transfers the pulses of the pulse generator to relay 4PB. Relay 3PD operates, prepares a path for the switch through relay 2EN, and closes the level A and B wipers of switch 7REC to the A and B windings of the shunt field relay 3PE. Relay 4PB follows the ground pulses from the pulse generator and repeats them as ground pulses to the magnet 7REC and through leads CD and CC to the coder-codexer hunter circuit. Switch 7REC follows the pulses to step its wipers, and on the first step operates its off-normal springs to open the number 2 winding of relay 1CA and closes ground to magnet SEQ operates. When ground from the codel relays in codel register group 21 through the bank terminal 1, levels E, R, G and H wipers of switch 7SEQ, and levels A and B wipers of switch 7REC is closed to both the A and B winding of relay 3PE, relay 3PE will operate, closes ground to the number 2 winding of relay 3PF and opens the circuit to the number 1 winding of relay 3PF. Relay 3PF operates, locks, transfers the 4PB ground pulses from magnet 7REC and lead CD to magnet 5TMU, and opens lead CC and circuit to the number 1 winding of relay 1CA. Relay 1CA restores and opens the circuit to relay 1CB. Relay 1CB restores, opens the circuit to magnet 7SEQ, and closes the "homing" circuit to switch 7REC. Switch 7REC "homes" to normal and, in so doing, opens the circuit to relay 3PE and closes the circuit to the number 1 winding of relay 1CA.

Relay 3PE restores. Switch 7SEQ restores and steps to bank terminal 2. Switch 5TMU steps from the relay 4PB ground pulses around to bank terminal N and closes ground through its level A wipers to the number 1 winding of relay 3PF. Relay 3PF restores (the number 1 winding and the number 2 winding of relay 3PF are opposed) and transfers the relay 4PB ground pulses from magnet 5TMU back to the magnet 7REC and leads CD and CC.

The digits are thus sent over leads CD and CC to the coder-codexer from the codel registers until the coder-codexer receives the required number of digits, as determined by that circuit, and replaces high resistance ground on lead CP with low resistance ground. (For single translation the ABC office code or the ABC office code and first terminal digit are sent and for dual translation the three digit area code and the ABC office code are sent.) Relay 3SP operates, closes a circuit to relay 3SS, and opens the holding path of relay 4PA. Relay 4PA restores and transfers the impulse generator pulses from relay 4PB to the number 2 winding of relay 4PA. (Relay 4PA operates only its "X" contacts on these ground pulses). Relay 3SS operates, locks, and closes ground to switch 7SEQ. Relay 4PB restores and opens the circuit to magnet 5TMU.

The relays 1CA, 1CB, and 3PE restore and switch 7REC "homes" to normal. Switch 5TMU stops stepping when relay 4PB restores, therefore, ground will not be closed to the number 1 winding of relay 3PF and relay 3PF stays operated on its number 2 winding. Switch 7SEQ, steps, interrupted by relay 7NS, to normal and restores its off-normal springs to close ground to number 1 winding of relay 3SL. Relay 3SC operates, locks through the number 2 winding, opens the operating path of switch 7SEQ, closes the coder-codexer to the A winding of relay 3PE through lead CA and the B winding of relay 3PE through lead CB, closes switch 7SEQ to lead CC and opens the number 1 winding of relay 3SL.

When the coder-codexer receives the routing digits from the translator, high resistance ground is returned on lead CP. Relay 3SP restores and closes to the 1 and 2 windings of relay 4PA in series. Relay 4PA operates and transfers the impulse generator pulses from the number 2 winding of relay 4PA to relay 4PB. Relay 4DB follows the ground pulses of the impulse generator and repeats them to magnet 5TMU. When switch 5TMU steps to bank terminal N, its level A wipers close ground to the number 1 winding of relay 3PF. Relay 3PF restores (the number 1 winding and the number 2 winding of relay 3PF are in opposition) and transfers the relay 4PB ground pulses from the magnet 5TMU to magnet 7SEQ and lead CD and CC. Switch 7SEQ follows the pulses to step its wipers and on the first step operates its off-normal springs. When ground is closed by the coder-codexer on both leads CA and CB to the A and B windings of relay 3PE, relay 3PE operates, closes ground to the number 2 winding of relay 3PF and opens the number 1 winding of relay 3PF. Relay 3PF operates, locks, closes ground to the relay 3SM transfers the relay 4PB ground pulses from magnet 7SEQ and lead CD to magnet 5TMU and opens lead CC. Relay 3SM operates, locks, opens the operating path of switch 7SEQ, opens circuit to relay 2MA, and opens the circuit to the winding of relay 4PA. Relay 2MA restores and prepares a path to the windings of relay 4PA if sending is to begin with the operation of the operator's wait lamp.

The coder-codexer removes ground from leads CA and CB. Relay 3PE restores. Relay 4PA restores and transfers the impulse generator pulses from relay 4PB to the number 2 winding of relay 4PA. Relay 4PB restores and opens the circuit to magnet 5TMU. Switch 5TMU stops stepping when relay 4PB restores, therefore, ground will not be closed to the number 1 winding of relay 3PF and relay 3PF remains operated.

The purpose of pulsing this digit from the coder-codexer into the ticketer was to step the switch 7SEQ to bank terminals which are associated with the digits stored in codel registers 21–26 that are not to be sent to the outgoing trunk. The wipers of switch 7SEQ are now on the bank terminal associated with the first digit that is to be sent.

*Seizing the ticketer selector and outgoing trunk*

When a Strowger type ticketer selector is provided, relay 2BS operates, when the ticketer is seized to close the line loop through leads +T and —T. This line loop seizes the selector, but sending the first digit is required for seizing the outgoing trunk.

When a rotary type ticketer selector is provided, normally relay 2MA operates when the switch 7SEQ steps to bank terminal 15, to close the line loop through leads +T and —T. This line loop seizes both ticketer selector and the outgoing trunk. Therefore, it is unnecessary to send the first digit to seize the outgoing trunk. For the special case when there is no translation and sending begins with the operation of the operator's accept key, relay 2DA operates when the operator depresses her accept key to seize the outgoing trunk.

*Sending digits to the ticketer selector*

SENDING WITH NO TRANSLATION WHEN STRAPPED TO BEGIN SENDING WITH OPERATION OF OPERATOR'S START KEY

If the operator keyed the calling number into the switch 7SEQ, sending will not start until the operator depresses her start key. When the start key was depressed relay 2MD operated, switch 7SEQ steps to bank terminal 1, and ground was closed to the number 1 winding of relay 3PC. Relay 3PC operates, locks through its number 2 winding, opens the number 1, closes a circuit to relay 3PD, and prepares a circuit to the number 1 winding and the number 2 winding of relay 4PA in series, closes a circuit to the number 2 winding of relay 1CA, and opens the operating path of switch 7SEQ. Relay 4PA operates only its "X" contacts on ground pulses from the impulse generator (which started with the operation of relay 2MB) through the number 2 winding of relay 4PA. On the succeeding pulses of the "X" contacts of relay 4PA after the operation of relay 3BC, ground is closed through the number 1 winding and the number 2 winding of relay 4PA in series. Relay 4PA operates fully and transfers the pulses of the pulse generator to the relay 4PB. Relay 4PB follows the pulses and repeats them as ground pulses to magnet 7REC and the number 1 winding of relay 1CA, and repeats them to the outgoing trunk by opening the line loop each time relay 4PB operates. Switch 7REC follows the relay 4PB ground pulses and steps its wipers. On the first step, its off-normal springs operate to open the number 2 winding of relay 1CA and closes ground to magnet 7SEQ. Magnet 7SEQ operates.

When ground from codel relays of the codel register group 21 through the level E, F, G, and H wipers of switch 7SEQ and the level A and B wipers of switch 7REC is closed to both the A and B windings of relay 3PE, relay 3PE operates, closes a circuit to the number 2 windings of relay 3PF, opens the number 1 winding of relay 3PF, shorts the line loop to the outgoing trunk. Relay 3PF operates, transfers the relay 4PB ground pulses from magnet 7REC to magnet 5TMU and opens the number 1 winding of relay 1CA. Relay 1CA restores and opens the circuit to relay 1CB. Relay 1CB restores, opens the circuit to magnet 7SEQ, and closes the "homing" circuit to magnet 7REC. Switch 7REC "homes" and in so doing opens the circuit to relay 3PE and possibly closes the circuit to the number 2 winding of relay 1CA. Switch 7SEQ restores and steps to bank terminal number 2. Switch 5TMU steps from the relay 4PB ground pulses to normal and closes ground through its level A wipers to the number 1 winding of relay 3PF. Relay 3PF restores (the number 1 winding and the number 2 winding of relay 3PF are in opposition), transfers the relay 4PB ground pulses from magnet 5TMU back to magnet 7REC and the number 1 winding of relay 1CA and removes the short from the outgoing line loop.

This sequence of operations involving relays 4PB, 1CA, 1CB, 3PE, and 3PF and switch 7REC, 7SEQ, and 5TMU continues, and the codel register groups 22–31 are scanned and sent in the same manner. On short haul calls switch 7SEQ will step over bank terminals 4, 5, and 6 from ground on its level A wipers. When the switch 7SEQ stores after sending the last digit stored in codels 21–31, it will step and close ground to the number 1 winding of relay 2EN through its level B wipers. This will occur when switch 7SEQ steps to bank terminal 10 for a six digit, terminal 11 for a seven digit or a ten digit, and terminal 12 for an eight or an eleven digit called number.

SENDING WITH NO TRANSLATION WHEN STRAPPED TO BEGIN SENDING WITH OPERATION OF OPERATOR'S ACCEPT KEY

If the operator keyed the calling number into the switch 6KEY, sending will begin when the operator depresses her accept key to close ground through lead 10P to the number 1 winding of relay 2DA. Relay 2DA operates and closes ground to magnet 7SEQ. Switch 7SEQ steps, interrupted by relay 7NS, to bank terminal 1 and closes ground through its level B wipers to the number 1 winding of relay 3PC. Relay 3PC operates, locks through the number 2 winding, and opens its number 1 winding, and closes a circuit to relay 3PD, and prepares a circuit to the number 1 winding of relay 4PA and the number 2 winding in series, closes a circuit to the number 2 winding of relay 1CA, and opens the operating path of switch 7SEQ. Relay 4PA operates only its "X" contacts on ground pulses from the impulse generator (which started with the operation of relay 2MB) through the number 2 winding of relay 4PA. On the succeeding pulse of the "X" contacts of relay 4PA after the operation of relay 3PC, ground is closed to the number 1 and the number 2 windings of relay 4PA in series. Relay 4PA operates fully and transfers the pulses of the pulse generator to relay 4PB. Relay 4PB follows the pulses and repeats them as ground pulses to magnet 7REC and the number 1 winding of relay 1CA and repeats them to the outgoing trunk by opening the line relay each time relay 4PB operates. Switch 7REC follows the ground pulses from relay 4PB and steps its wipers. On the first step, its off-normal springs operate to open the number 2 winding of relay 1CA and closes ground to magnet 7SEQ. Magnet 7SEQ operates.

When ground from codel register group 21 through the level E, F, G and H wipers of switch 7SEQ and the level A and B wipers of switch 7REC is closed to both the A and B windings of 3PE, relay 3PE operates, closes circuit to the number 2 winding of relay 3PF, and opens the circuit to the number 1 winding of relay 3PF, and shorts the line loop to the outgoing trunk. Relay 3PF operates, transfers the ground pulses from relay 4PB and magnet 7REC to magnet 5TMU and opens the number 1 winding of relay 1CA. Relay 1CA restores and opens the circuit to relay 1CB. Relay 1CB restores, opens the circuit to magnet 7SEQ, and closes the "homing" circuit to magnet 7REC. Switch 7REC "homes" and in so doing opens a circuit to relay 3PE and possibly closes a circuit to the number 2 winding of relay 1CA. Switch 7SEQ restores and steps to bank terminal number 2. Switch 5TMU steps from the relay 4PB ground pulses to normal and closes ground through its level A wipers to the number 1 winding of relay 3PF. Relay 3PE restores (the number 1 winding and the number 2 winding of relay 3PF are in opposition), transfers the relay 4PB ground pulses from magnet 5TMU back to magnet 7REC and the number 1 winding of relay 1CA, and receives a short from the outgoing line loop.

This sequence of operations involving relays 4PB, 1CA, 1CB, 3PE and 3PF and switch 7REC, switches 7REC, 7SEQ and 5TMU continues, and the codel register groups 22–29 are scanned and sent in the same manner. On short haul calls, switch 7SEQ will step over bank terminals 4, 5 and 6 from ground on its level A wipers. When switch 7SEQ steps to bank terminal 9 ground is closed through its level C wipers to relay 2MA. Relay 2MA operates and opens the winding of relay 4PA. Relay 4PA restores and transfers the impulse generator pulses from relay 4PB to the number 2 winding of relay 4PA. Relay 4PB restores with relay 3PF operated and switch 5TMU off-normal. When the operator depresses her start key, relay 2MD operates and opens the circuit to relay 2MA. Relay 2MA restores and closes a circuit to the number 1 and number 2 winding of relay 4PA in series. Relay 4PA reoperates and closes the impulse generator pulses to relay 4PB. Relay 4PB follows the pulses and repeats them to magnet 5TMU.

The remaining digits are sent in the same manner until the last terminal digit in the called number is sent. Switch 7SEQ will then step to the next bank contact and close ground to the number 1 winding of relay 2EN through its level B wipers. This will occur when switch 7SEQ steps to bank terminal 10 for a six digit, terminal 11 for a seven or a ten digit, and terminal 12 for an eight or an eleven digit called number.

SENDING WITH TRANSLATION WHEN STRAPPED TO BEGIN SENDING WITH OPERATION OF OPERATOR'S WAIT LAMP

When translation is provided for a called number, it was seen in the previous sections that the operator keyed the calling number into the switch 6KEY and while the coder-codexer translated the number and stepped the switch 7SEQ to the bank terminal associated with the first digit to be sent as stored in the codel register groups 21–31.

If sending is to begin with the operation of the operator's wait lamp, low resistance ground is returned on lead 1CP to reoperate 3SC. Therefore, when relay 2MA restores, the path is completed to the number 1 and 2 windings of relay 4PA in series. Relay 4PA operates and closes the impulse generator pulses to relay 4PB. Relay 4PB follows the ground pulses of the impulse generator and repeats them to magnet 5TMU. When switch 5TMU steps to bank terminal N, it closes ground through its level A wipers to the number 1 winding of relay 3PF. Relay 3PF restores and transfers the relay 4PB ground pulses from magnet 5TMU to leads CD and CC and also to the outgoing trunk.

This pulsing continues until ground from the coder-codexer on both leads 1CA and 1CB is closed to the A and B windings of relay 3PE. Relay 3PE operates, closes ground to the number 2 winding of relay 3PF, opens the number 1 winding of relay 3PF, and shorts the outgoing loop. Relay 3PF operates, locks, and transfers the relay 4PB ground pulses to magnet 5TMU. Ground is removed from leads CA and CB to open the circuit to relay 3PE. Relay 3PE restores. Relays 1CA and 1CB will remain operated during sending from the coder-codexer unless relay 4LD is operated. Their operating or non-operating does not affect sending. Switch 5TMU steps from the relay 4PB ground pulses to bank terminal N and closes ground through its level A wipers to the number 1 winding of relay 3PF. Relay 3PF restores, transfers the relay 3PB ground pulses from magnet 5TMU to leads CC and CB and removes the short from the outgoing trunk loop. This sequence of operations for relays 4PB, 3PE, and 3PF and switch 5TMU continues until the coder-codexer sends its last digit and removes ground from lead 1CP. Relay 3SA restores, opens leads CC and CD and the holding path for relays 3SL and 3SS. When switch 5TMU steps to bank terminal N, relay 3PF operates, opens the circuit to relays 3SS and 3SL, opens leads CA and CB, removes a short from the outgoing line loop, and transfers the relay 4PB ground pulses from magnet 5TMU. Relay 3SS restores. Relay 3SL restores and closes the relay 4PB ground pulses to magnet 7REC. The digits are now sent out from the original codels and the sequence of operations for relay 4PB, 1CA, 1CB, 3PE and 3PF, and switches 7REC, 7SEQ and 5TMU are as described in the section entitled "Sending with no translation when strapped to begin sending with operation of operator's start key." When switch 7SEQ steps to bank terminal 9, ground is closed through its level C wipers to relay 2MA. Relay 2MA operates, and opens the windings of relay 4PA.

Relay 4PA restores and transfers the impulse generator pulses from relay 4PB to the number 2 winding of relay 4PA. Relay 4PB restores with relay 3PF operated and switch 5TMU off-normal. When the operator depresses her start key relay 2MD operates and opens a circuit to relay 2MA. Relay 2MA restores and closes the circuit to the number 1 and 2 windings of relay 4PA in series. Relay 4PA reoperates and closes an impulse generator pulse to relay 4PB. Relay 4PB follows the pulses and repeats them to magnet 5TMU.

The remaining digits are sent in the same manner until the last terminal digit in the called number is sent. Switch 7SEQ will then step to the next bank contact and close ground to the number 1 winding of relay 2EN through its level B wipers. This will occur when switch 7SEQ steps to bank terminal 10 for a six digit, terminal 11 for a seven or a ten digit, and terminal 12 for an eight or eleven digit called number.

SENDING WITH TRANSLATION WITH STRAPPED TO BEGIN SENDING WHEN OPERATION OF OPERATOR'S START KEY

When translation is provided for the called number, it was seen in the previous section that the operator keyed the called number into the switch 6KEY and meanwhile the coder-codexer translated the number and stepped the switch 7SEQ to the bank terminal associated with the first digit stored in the codel register groups 21–31 to be sent.

If sending is to begin with the operation of the operator's start key, high resistance ground remains on lead 1CP and relay 3SP does not reoperate. When the operator depresses her start key, relay 2MD operates and the path is completed to the number 1 and number 2 windings of relay 4PA in series.

Relay 4PA operates and closes the impulse generator pulses to relay 4PB. Relay 4PB follows the ground pulses of the impulse generator and repeats them to magnet 5TMU. When switch 5TMU steps to bank terminal N, it closes ground through its level A wipers to the number 1 winding of relay 3PF. Relay 3PF restores and transfers the relay 4PB ground pulses from magnet 5TMU to lead CD and CC and also to the outgoing trunk.

This pulsing continues until ground from the coder-codexer on both leads CA and CB is closed to the A and B windings of relay 3PE. Relay 3PE operates, closes ground to the number 2 winding of relay 3PF, opens the number 1 winding of relay 3PE, and shorts the outgoing loop. Relay 3PF operates, locks, and transfers the relay 4PB ground pulses to magnet 5TMU. Ground is removed from leads CA and CB to open the circuit to relay 3PE. Relay 3PE restores. Relay 1CA and 1CB will remain operated during sending from the coder-codexer unless relay 4LD is operated. Their operating or non-operating does not affect sending. Switch 5TMU steps from the relay 4PB ground pulses to bank terminal N and closes ground through its level A wipers to the number 1 winding of relay 3PF. Relay 3PF restores, transfers the relay 4PB ground pulses from magnet 5TMU to leads CC and CD and removes the short from the outgoing trunk loop. This sequence of operation for relays 4PB, 3PE, and 3PF and switch 5TMU continues until the coder-codexer sends its last digit and removes ground from lead CP. Relay 3SA restores, opens leads CC and CD and the holding path for relays 3SL and 3SS. When switch 5TMU steps to bank terminal N, relay 3PF operates, opens the circuit to relays 3SS and 3SL, opens leads CA and CB, removes the short from the outgoing line loop, and transfers the relay 4PB ground pulses from magnet 5TMU. Relay 3SS restores. Relay 3SL restores and closes the relay 4PB ground pulses to magnet 7REC. The digits are now sent out from the original codel register groups and the sequence of operations for relays 4PB, 1CA, 1CB, 3PE and 3PF, and switches 7REC, 7SEQ and 5TMU are as described in the preceding sections.

This sequence of operations involving relays 4PB, 1CA, 1CB, 3PE and 3PF and switches 7REC, 7SEQ and 5TMU continues, and the codel register groups 22–31 are scanned and sent in the same manner.

On short haul calls, switch 7SEQ will step over bank terminals 4, 5 and 6 from ground on its level A wipers. When switch 7SEQ restores after sending the last digit stored in codel register groups 21–31, it will step and close ground to the number 1 winding of relay 2EN through its level B wipers. This will occur when switch 7SEQ steps to bank terminal 10 having a six digit, terminal 11 having a seven or a ten digit, and terminal 12 having an eight or an eleven digit called number.

*Stop dial and flashing signal supervision*

If stop dial is encountered during the sending interval ground is closed to lead 1EC. Relay 2AN operates, opens the path to the number 1 winding of relay 3PF, closes a circuit to relay 4TD, and closes ground to lead release alarm. Relay 4TD operates. Switch 5TMU follows the relay 4PB ground pulses. Each time switch 5TMU steps to bank terminal 10, ground is closed through the level A wipers of switch 5TMU to magnet 6TMT. On the next relay 4PB ground pulses, switch 5TMU operates its interrupter springs to open the circuit to magnet 6TMT. Switch 6TMT restores and advances its wipers to bank terminal 1.

When stop dial supervision is removed, relay 2AN restores. Relay 4TD remains operated from its holding ground through the off-normal springs 1 and 2 of switch 6TMT and in series with the number 2 winding of relay 4TC. Relay 4TC operates. When switch 6TMT steps to bank terminal 7 ground is closed through its level B wipers to the number 1 winding of relay 3PF. Relay 3PF operates, transfers the relay 4PB ground pulses from magnet 5TMU to start sending the next digit, and closes the circuit to the number 2 winding of relay 4TP. Relay 4TP operates and closes the "homing" circuit to switch 5TMU. Switch 5TMU "homes" to normal and closes the "homing" circuit to switch 6TMT. Switch 6TMT "homes" to normal and opens the circuit to relays 4TD and 4TC. Relay 4TC restores. Relay 4TD restores and opens the circuit to relay 4TP. Relay 4TP restores.

If stop dial is not removed when switch 6TMT steps to bank terminal 7, stepping continues as described to bank terminal 9, at which point, ground is closed through the level B wipers of switch 6TMT to the number 2 winding of relay 2BC. Relay 2BC operates, closes busy tone to the calling subscriber, opens the line loop to release the succeeding equipment, closes direct ground from contact 2BC5T to lead CU, opens the circuit to relay 3SA and the number 1 winding of relay 3SP (if operated), locks through the number 1 winding of relay 2BC, removes ground from the impulse generator and opens the windings of relay 4PA. Relay 4PA restores. The impulse generator and relay 4PB restore and stop the ground pulses to magnet 5TMU.

If the digits are being sent to the coder-codexer, relay 3SA restores. The ticketer remains thus operated until the calling party disconnects.

If a flashing signal is closed to lead EC during the sending interval, relay 2AN operates on the first ground pulse, opens the path to the number 1 winding of relay 3PF, closes lead CPT to the number 1 winding of relay 4PT, closes lead release alarm, and closes a circuit to relay 4TD. Relay 4TP ground pulses do not step switch 5TMP as relay 3PD is operated. Relay 4TD operates, transfers the control of the number 1 winding of relay 3PF from bank terminal N level A, of switch 5TMU to make contacts 4TP11, and closes a holding path from ground on contacts 4TD5, through the off-normal springs 1 and 2 of switch 6TMT, interrupter springs 3 and 4 of switch 5TMP and the number 2 winding of relay 4TC. Relay 4TC is shunted for the duration of the pulse.

When ground is removed from lead 2C, relay 2AN restores, opens lead CPT to the number 1 winding of relay 4TP, and removes the shunt from the number 2 winding 4TC. Relay 4TC operates in series with relay 4TD and prepares a path through the number 1 winding of relay 4TC to rotary switch magnet 5TMP. On the next ground pulse on lead EC, relay 2AN reoperates and closes ground to magnet 5TMP. Magnet 5TMP operates. At the end of the pulse, relay 2AN restores and opens the circuit to rotary switch magnet 5TMP. Switch 5TMP restores, steps and operates its off-normal springs to close ground to the number 1 winding of relay 2BC, ground from contact 1BA9 through break contacts 2EN2B, make contacts 2MC8T, lead 431, rotary switch 5TMP, off-normal springs 5 and 4, lead 433, make contact 3PD12B to the number 1 winding of relay 2BC. Relay 2BC operates, locks, closes busy tone to the calling subscriber, opens the line loops to release the succeeding equipment, closes direct ground to lead 1CU, opens the circuit to relay 3SA and to the number 1 winding of relay 3SP (if operated), removes ground from the impulse generator, and opens the circuit to the windings of relay 4PA. Relay 4PA restores. The impulse generator and relay 4PB restore and stop the ground pulses to magnet 5TMU. The ticketer remains thus operated until the calling party disconnects.

*Switch through*

When switch 7SEQ restores and steps after the last digit is sent to the outgoing trunk, ground is closed to the number 1 winding of relay 2EN. Relay 2EN operates, locks to contact 1BA9 through the number 2 winding of relay 2EN, closes ground to lead CT to cause the ticketer to switch through, closes lead CU from the preceding equipment to lead C of the ticketer selector, closes relay 1BA to locking ground on lead C, opens the circuit to the number 1 winding of relay 1AA and the number 2 winding of relay 1AA, switches the subscriber's loop from the preceding selector through to the ticketer selector, opens all relays which are held by ground from contact 1BA9 (except relay 2EN) and removes the ground from the impulse generator. All relays restore except relays 1BA, 1BB, 2EN, and the codels.

*Called party answers*

When the called party answers, "answer" supervision is relayed through the trunk circuits and the ticketer selector to this circuit by ground over lead EC.

Relay 2AN operates, extends relay 4TP to a source of 1 second time pulses on lead CPT and transfers the ticketer monitor lamp and lead LP from direct ground to lead 60IPM through resistor 2R4. This causes the ticketer monitor lamp to flash dimly at 60IPM to indicate the call has been answered. Relay 4TP follows the pulses on lead CPT and pulses at the rate of one pulse per second.

*Conservation timing*

This ticketer times the length of conversation and provides a maximum 309 minute timing interval. The conversation time is accumulated on rotary switches 5TMP, 5TMU, and 6TMT. Although the conversation timing cycle begins when answer supervision is received, a "grace" period (normally six seconds) is provided before any conversation time is actually registered. Immediately after this "grace" period, the first minute of conversation is registered. At the end of the first minute of conversation, the second minute is registered, etc. until the end of the call or the 309 minute timing interval elapses. The "grace" period is designed to prevent ticketing of calls to wrong numbers and its length can be varied.

Relay 4TB operates from the first pulse on lead CPT following the operation of relay 2AN and closes a circuit to relay 4TD. Relay 4TP operates and closes its holding circuit through the number 2 winding of relay 4TC which is shunted for the duration of the pulse. At the end of this pulse, relay 4TP restores and removes the shunt from the number 2 winding of relay 4TC. Relay 4TC operates in series with relay 4TD and transfers the relay 4TP pulsing circuit through the number 1 winding of relay 4TC to switch 5TMP.

Relay 4TP operates on the second pulse on lead CPT and closes a circuit to magnet 5TMP through the number 1 winding of relay 4TC. Magnet 5TMP operates. At the end of the second pulse, magnet 5TMP restores and the wipers of switch 5TMP restores and the wipers of switch 5TMP are advanced one step. Relays 4TC and 4TD remain operated and the wipers of switch 5TMP are now stepped once each second until they reach bank terminal 6 at the end of the sixth pulse. At this time, switch 8SEND steps, self-interrupted, to bank terminal 1 and closes a circuit to relay 2PB. The wipers of switch 8SEND remain engaged on bank terminal 1 until the end of the conversation, at which time rotary switch 8SEND begins transferring the ticketing information to the tabulator. Relay 2PD operates, closes a holding path to the number 2 winding of relay 2AN, closes the number 1 winding of relay 4TR to the dater timer through lead 1TR, opens the relay 4TD locking path, closes the number 1 winding of relay 1GE through the number 1 winding of relay 1GA, to lead 1P, removes the shunt from the interrupter springs 3 and 4 of rotary switch 5TMP, and closes ground through resistor 2R4 to lead 1LP and the ticketer monitor lamp. The ticketer monitor lamp lights dimly to indicate the conversation timing has started.

On the seventh pulse relay 4TP operates and closes a circuit to rotary switch magnet 5TMP through the number 1 winding of relay 4TC. Magnet 5TMP operates and opens its interrupter springs 3 and 4. The interrupter springs open the holding circuit of relay 4TD. Relay 4TD restores while relay 4TC remains operated on its number 1 winding for the duration of the pulse. The relays 4TB and 4TC and magnet 5TMP restore at the end of the pulse. The wipers of switch 5TMP are advanced to bank terminal 7.

On the eighth pulse relay 4TP operates and closes a circuit to relay 4TD. Relay 4TD operates and closes its holding circuit to the number 2 winding of relay 4TC. When relay 4TP restores at the end of this pulse relay 4TC operates in series with relay 4TD and transfers the relay 4TB pulsing circuit to switch 5TMP.

On the ninth pulse, relay 4TP and magnet 5TMP operate. Relay 4TD restores, but relay 4TC remains operated on its number 1 winding for the duration of the pulse. At the end of this pulse, relays 4TP and 4TC and rotary switch magnet 5TMP again restore. The wipers of switch 5TMP are advanced to bank terminal 8.

In this manner, alternate pulses from relay 4TP now step switch 5TMP at the rate of one step every two seconds.

Switch 5TMP is used for counting groups of 30 pulses but is a 33 step mechanism. Each time the wipers of level A step to bank terminal 10, ground is closed through the interrupter springs 1 and 2 to the magnet 5TMP. Thus, every time the level A wipers step to bank terminal 10, switch 5TMP steps, self-interrupted, and advances its wipers one step without changing the count.

Level A of switch 5TMP is thus scanned at twenty seconds intervals. Level B has two of the wipers removed and is, therefore, scanned only once each minute.

At the end of the first and each succeeding minute, the level C wipers is engaged on bank terminal 3. Upon the next pulse following the operation of relays 4TD and 4TC, relay 4TP closes magnet 5TMP, and closes ground on the level C wiper through contacts 2BD9B, 4TC7, 4TP3, lead 442 to magnet 5TMU. Magnet 5TMP operates and opens a circuit to relay 4TD. Magnet 5TMU operates. At the end of these pulses, switch 5TMP advances its wipers to bank terminal 4 and switch 5TMU advances its wipers one step. In this manner switch 5TMU restores the unit minute digits in codel code on leads W34, X34, Y34 and Z34.

After nine minutes the level C wiper of switch 5TMP is again engaged on bank terminal 3 and the wipers of switch 5TMU are engaged on bank terminal 8. Upon the next pulse following the operation of relays 4TD and 4TC, relay 4TP closes the circuit to magnets 5TMP, 5TMU and 6TMT. At the end of this pulse, switches 5TMP, 5TMU, and 6TMT advances their wipers one step. Switch 5TMU steps, self-interrupted, from ground on level B, bank terminal 9 and advances its wipers to bank terminal 10. A ten minute interval will elapse before the wipers of switch 5TMU again engage bank terminal 8. After each subsequent ten minute interval, when switch 5TMU engages bank terminal 8, switch 6TMT advances its wipers one step. Levels A and B of switch 6TMT are scanned at one hundred minute intervals and thus mark, in codel form, the ten minute digits on leads W33, X33, Y33 and Z33. The wipers of level C, E, and F have two of their wipers removed and are spaced one hundred minutes apart. Switch 6TMT also is a 33 step mechanism, but when the level C and E wipers engage bank terminal N, it steps self-interrupted, and advances its wipers one step. Level C is scanned during the first one hundred minute interval, level E during the second one hundred minute interval, and level F during the third one hundred minute interval. One wiper of level D is removed to have this level scanned only during the second and third one hundred minute interval. Thus, the one hundred minute digits are registered in codel form on leads W32, X32, Y32, and Z32.

Should the conversation timing reach 300 minutes, relay 4TE operates from ground on the level F wiper of switch 6TMT engaged on bank terminal 10. Relay 4TE closes ground to leads Z32, closes ground to lead 300 minutes alarm, and closes lead 60IPM to the ticketer monitor lamp and lead 10L. The ticketer monitor lamp flashes brightly at 60IPM to indicate that 300 minutes of conversation time have elapsed. At this time, leads W32, Z32, Z33 and Z34 are grounded and registered digits 300 as the conversation time.

The ticketer is capable of registering the conversation time up to a maximum of 309 minutes. At the start of 310 minutes, the wipers of switch 6TMT are advanced to normal, and relay 4TE restores, and the cycle of conversation timing continues as before. Consequently, 310th minute of conversation is registered as "000," the 311th as "001," etc.

*End of conversation*

When the called party disconnects, ground is removed from lead EC to open the operating path to relay 2AN. Relay 2AN remains operated on its holding path until the calling party disconnects.

When the calling party disconnects, the ticketer selector releases and removes ground from lead 1C to open the circuit to relay 1BA. The preceding equipment releases, but this circuit will not release until the stored call information has been transferred to the tabulator. Relay 1BA restores, closes a circuit to the number 2 winding of relay 2BC, and opens the circuit to relays 2AN and 2EN. Relay 2BC operates, grounds lead 1CU to guard this switch against seizure, and closes ground to relay 1GE and over lead P to the tabulator. Relay 2EN restores to close the "homing" circuit to switch 7REC and open lead CT. Relay 2AN restores, opens the timing circuits, and transfers the ticketer monitor lamp and lead 1LP from resistance 2R4 ground to lead 120IPM through resistor 2R3. The ticketer monitor lamp flashes dimly at 120IPM until the stored information has been transferred to a tabulator. Relay 1GE operates, closes ground to lead 1TST to the tabulator allotter, and removes ground from lead 1H to mark this circuit as the calling ticketer.

*Transferring ticketing information to a tabulator*

Absence of ground on lead 1H permits a tabulator to stop on this switch. When a tabulator is connected to this ticketer, there is a continuity check circuit through a relay in the tabulator to ground through the number 1 winding of relay 1GA in the ticketer. This continuity check circuit traces back and forth between the ticketer and tabulator checking the continuity of leads 8W, 8X, 8Y, 8Z and 8P between these circuits and the status of switches and relays for satisfactory ticketer tabulator operation. If the continuity check circuit is complete, relay 1GA operates its "X" contacts 1GA1, locks through the number 2 winding of relay 1GA, operates completely, opens the number 1 winding of relay 1GA from lead 8P, closes lead 8P to magnet 8SEND, and opens circuit to the relay 1GE. Relay 1GE restores, opens lead 1TST and closes ground to lead 1H.

The ticketing and record data stored in this switch is now rapidly transferred to the tabulator. The switch 8SEND is stepped by pulses from the tabulator to lead 8P and a similar switch is stepped in unison in the tabulator. As the wipers of switch 8SEND are advanced, on each step they close ground from the codel relay in this circuit through the bank terminals and leads 8W, 8X, 8Y and 8Z to operate codel groups in the tabulator.

The order in which the data is transferred is as follows. (If the calling number is less than seven digits, Codels 1, 2 and 3 may contain no information. The number of digits in the calling number is indicated in parenthesis.)

FOR A SIX-SEVEN DIGIT SYSTEM

| Bank Terminals | |
|---|---|
| 2 | Called Number Office Code A digit (Codel 21). |
| 3 | Called Number Office Code B digit (Codel 22). |
| 4 | Called Number 1st Terminal digit (Codel 23). |
| 5 | No information using 6-7 digit system. |
| 6 | No information using 6-7 digit system. |
| 7 | No information using 6-7 digit system. |
| 8 | Calling Number (7) Office Code A digit (Codel 1). |
| 9 | Calling Number (7) Office Code B digit (Codel 2). (6) Office Code A digit (Codel 2). |
| 10 | Calling Number (7) Office Code C digit (Codel 3). (6) Office Code B digit (Codel 3). (5) 1st Terminal digit (Codel 3). |
| 11 | Conversation time Hundreds digit (minutes). |
| 12 | Converdation time Tens digit (minutes). |
| 13 | Conversation time Units digit (minutes). |
| 14 | Level C Ticketer identity hundreds digit. Level D Ground indicates a change of toll rates during call. |
| 15 | Ticketer identity Tens digit. |
| 16 | Ticketer identity Units digit. |
| 17 | Called Number 2nd Terminal digit (Codel 27). |
| 18 | Called Number 3rd Terminal digit (Codel 28). |
| 19 | Called Number 4th Terminal digit (Codel 29). |
| 20 | Called Number (Seven digit calls only) 5th Terminal digit (Codel 30). |
| 21 | No information using 6-7 digit system. |
| 22 | Calling Number (4, 6 or 7) 1st Terminal digit (Codel 4). (5) 2nd Terminal digit (Codel 4). |
| 23 | Calling Number (4, 6 or 7) 2nd Terminal digit (Codel 5). (5) 3rd Terminal digit (Codel 5). |
| 24 | Calling Number (4, 6 or 7) 3rd Terminal digit (Codel 6). (5) 4th Terminal digit (Codel 6). |
| 25 | Calling Number (4, 6 or 7) 4th Terminal digit (Codel 7). (5) 5th Terminal digit (Codel 7). |

SHORT HAUL FOR A SEVEN OR A SEVEN-EIGHT DIGIT SYSTEM

We shall assume a seven digit calling number for this and for the ten or eleven digit calls. If the calling number is four, five, or six, refer to the above case for Codels 1-7.

| Bank Terminals | |
|---|---|
| 2 | Called Number Office Code A digit (Codel 21). |
| 3 | Called Number Office Code B digit (Codel 22). |
| 4 | Called Number Office Code C digit (Codel 23). |
| 5 | No information on short haul calls. |
| 6 | No information on short haul calls. |
| 7 | No information on short haul calls. |
| 8 | Calling Number Office Code A digit (Codel 1). |
| 9 | Calling Number Office Code B digit (Codel 2). |
| 10 | Calling Number Office Code C digit (Codel 3). |
| 11 | Conversation time Hundreds digit (minutes). |
| 12 | Conversation time Tens digit (minutes). |
| 13 | Conversation time Units digit (minutes). |
| 14 | Level B Absence of ground indicates a short haul call. Level C Ticketer identity hundreds digit. Level D Ground indicates a change of toll rates during call. |
| 15 | Ticketer identity (tens digit). |
| 16 | Ticketer identity (units digit). |
| 17 | Called Number 1st Terminal digit (Codel 27). |
| 18 | Called Number 2nd Terminal digit (Codel 28). |
| 19 | Called Number 3rd Terminal digit (Codel 29). |
| 20 | Called Number 4th Terminal digit (Codel 30). |
| 21 | Called Number (Eight digit calls only) 5th Terminal digit (Codel 31). |
| 22 | Calling Number 1st Terminal digit (Codel 4). |
| 23 | Calling Number 2nd Terminal digit (Codel 5). |
| 24 | Calling Number 3rd Terminal digit (Codel 6). |
| 25 | Calling Number 4th Terminal digit (Codel 7). |

LONG HAUL FOR A SEVEN OR A SEVEN-EIGHT DIGIT SYSTEM

| Bank Terminals | |
|---|---|
| 2 | Called Number 1st area code digit (Codel 21). |
| 3 | Called Number 2nd area code digit (Codel 22). |
| 4 | Called Number 3rd area code digit (Codel 23). |
| 5 | Called Number Office Code A digit (Codel 24). |
| 6 | Called Number Office Code B digit (Codel 25). |
| 7 | Called Number Office Code C digit (Codel 26). |
| 8 | Calling Number Office Code A digit (Codel 1). |
| 9 | Calling Number Office Code B digit (Codel 2). |
| 10 | Calling Number Office Code C digit (Codel 3). |
| 11 | Conversation time Hundreds digit (minutes). |
| 12 | Conversation time Tens digit (minutes). |
| 13 | Conversation time Units digit (minutes). |
| 14 | Level B Ground indicates a long haul call.<br>Level C Ticketer identity hundreds digit.<br>Level D Ground indicates a change of toll rates during call. |
| 15 | Ticketer identity tens digit. |
| 16 | Ticketer identity units digit. |
| 17 | Called Number 1st Terminal Digit (Codel 27). |
| 18 | Called Number 2nd Terminal Digit (Codel 28). |
| 19 | Called Number 3rd Terminal Digit (Codel 29). |
| 20 | Called Number 4th Terminal Digit (Codel 30). |
| 21 | Called Number (Eleven digit calls only) 5th Terminal Digit (Codel 31). |
| 22 | Calling Number 1st Terminal Digit (Codel 4). |
| 23 | Calling Number 2nd Terminal Digit (Codel 5). |
| 24 | Calling Number 3rd Terminal Digit (Codel 6). |
| 25 | Calling Number 4th Terminal Digit (Codel 7). |

When all this information has been transferred, switch 8SEND steps to bank terminal N and opens the circuit to relay 2BD.

*Release from completed and timed call*

Relay 2BD restores, closes ground to lead 1LP and the ticketer monitor lamp, opens lead 1TR from the dater timer to the number 1 winding of relay 4TR, and opens the circuit to the number 2 winding of relay 1BB and relay 1GA. The ticketer monitor lamp lights brightly to indicate all the information has been transferred to the tabulator. Relay 1GA restores. Relay 1BB restores, opens the circuit to relays 4LH and 4TR (if operated), closes low resistance ground through relay 2BE to magnet 7SEQ, and removes the holding ground from all codels. Relay 2BE operates, closes ground through lead release alarm to a delayed release alarm, closes ground to the number 2 winding of relay 2BC to hold relay 2BC operated, and replaces ground with 120IPM ground pulses on the ticketer monitor lamp and lead 1LP. The ticketer monitor lamp flashes brightly at 120IPM to indicate that the ticketer should be restoring to normal condition.

Switch 7SEQ steps, self-interrupted, to normal when its off-normal springs restore and transfer the circuit from its magnet to magnet 6KEY. In the same manner switches 6KEY, 5TMP, 5TMU, and 6TMT step to normal after each preceding switch has returned to normal position.

During the above "homing," relay 2BE remains operated from battery through the various magnets. When all the switches are in normal position, relay 2BE restores, removes the 120IPM ground pulses from the ticketer monitor lamp and lead 1LP, and opens a circuit to the number 2 winding of relay 2BC. Relay 2BC restores, opens lead 1LP from the ticketer monitor lamp, grounds leads 1ATB, and replaces ground with resistance battery on lead 1CU. The ticketer is now idle and free to ticket another call.

*Release from incompleted calls*

If the call is not answered, relay 2AN never operates, hence relay 2BD does not operate. When the calling party disconnects, the ticketer selector or trunk circuit releases and removes ground from lead 1C to open the circuit to relay 1BA. The preceding equipment releases. Relay 1BA restores, closes a circuit to the number 2 winding of relay 2BC, and opens the circuit to the number 2 winding of relay 1BB and the number 2 winding of relay 2EN. Relay 2BC operates and ground lead 1CU to guard this switch against seizure. Relay 2EN restores, closes the "homing" circuit to switch 7REC and removes ground from lead 1CT. Relay 1BB restores, opens the circuit to relay 4LH (if operated), closes low resistance ground through relay 2BE to magnet 7SEQ and 6KEY, and opens the holding circuit for all the codels. Switch 7REC "homes" to normal. Relay 2BE operates, closes ground through lead release alarm to a delayed release alarm, and replaces ground at the 120IPM ground pulses to the ticketer monitor lamp and lead 1LT. The ticketer monitor lamp flashes brightly at 120IPM to indicate that the ticketer should be restoring to normal condition.

Switch 7SEQ and 6KEY step, self-interrupted, to normal. Relay 2BE restores, removes the 120IPM ground pulses from the ticketer monitor lamp and lead 1LT, removes ground from lead release alarm, and opens the circuit to the number 2 winding of relay 2BC. Relay 2BC restores, opens lead 1LP from the ticketer manitor lamp, grounds lead 1ATB, and replaces ground with the resistance battery on lead 1CU. The ticketer is now idle and free to ticket another call.

*Called party busy*

If the called line is busy, busy tone is returned to the subscriber from the succeeding equipment. The ticketer remains operated until the calling party disconnects.

*Release from called party busy condition*

When the calling party disconnects after receiving busy tone the loop is opened to relay 1AA. When the calling party disconnects, release takes place in the same manner as described in the section entitled "Release from incompleted call."

*Release from a timed out call*

If the subscriber failed to dial the called number within the prescribed amount of time and busy tone was returned to the subscriber, then the loop is opened and relay 1AA restores upon the party disconnecting. Release of the ticketer is similar to that described in the succeeding section. Various relays and switches mentioned may not be operated but the sequence of release is the same.

*Release from a stop dial condition*

When the calling party disconnects after receiving busy tone due to stop dial supervision, the loop circuit is opened to relay 1AA. Relay 1AA restores and opens the circuit to relay 1BA. Relay 1BA restores and removes the holding ground from all relays. All relays except 2BC restore and close a low resistance "homing" circuit through relay 2BE to magnets 7SEQ, 6KEY, 5TMU and 6TMT. Relay 2BE operates, closes ground to the lead release alarm, and closes a circuit to the number 2 winding of relay 2BC to hold it operated and transfers the ticketer monitor lamp and lead 1LP from ground to lead 120IPM. The ticketer monitor lamp flashes brightly at 120IPM to indicate that the ticketer is restoring to normal condition.

Switches 7SEQ, 6KEY, 5TMU and 6TMT step, self-interrupted, to normal. Relay 2BE restores, removes 120IPM ground pulses from the ticketer monitor lamp and lead 1LP, removes ground from lead release alarm, and opens the circuit to the number 2 winding of relay 2BC. Relay 2BC restores, opens lead 1LP from the ticketer monitor lamp, grounds lead 1ATB, and replaces ground to the resistance battery on lead 1CU. The ticketer is now idle and free to ticket another call.

*Release from a flashing signal condition*

When the calling party disconnects after receiving busy tone, the loop is opened to relay 1AA. Release from flashing signal condition is the same as described in the preceding section. Switch 5TMP will step, self-interrupted, to normal in the same manner as the switches described in the preceding section between "homing" of switches 6KEY and 5TMU. When all of the relays, codels, and switches are restored or at normal, the ticketer is free to ticket another call.

*Release by operator withdrawal*

When the calling party disconnects after busy tone due to the operator withdrawing from the call, the loop circuit is opened to relay 1AA. Release of the circuit is the same as explained in the penultimate section preceding.

*No such number routing*

The ticketer may be strapped to return busy tone on all area codes. Also, if an area or office code which does not exist is sent for translation, the translator will either send a special routing directive to route the call to an operator, or it will release itself and cause the ticketer to send busy tone to the calling party.

*No such number routed to terminate in busy tone*

If the call is to terminate in busy tone, the translator will send a setter digit to step switch 7SEQ as described in section titled "Translation." The digit, however, will be larger than described and step switch 7SEQ to the bank terminal where ground from its level A wipers is closed to the number 1 winding of relay 2BC. Relay 2BC operates, locks, closes direct ground to lead 1CU, and returns busy tone to the calling subscriber. The ticketer remains thus operated until the calling party disconnects. When the calling party disconnects, the line loop is opened, relay 1AA restores and the ticketer is released as previously described.

*No such number routed to the operator*

If the call is to be routed to an operator, the translator will send a setter digit to the step switch 7SEQ to switch through. Switch through takes place and a 2 or 3 digit directive is sent from the coder-codexer to the outgoing trunk. This directive will route the call to an operator or a recorded message through the special selector levels. Release takes place when the calling party disconnects.

*Change of toll rates during call*

Each time the dater timer changes the toll rates from day to night rates or night to day rates, it closes a ground pulse on lead 1TR. If a conversation is in progress in this circuit, relay 2BD is operated, and the pulse on lead 1TR closes a circuit to relay 4TR. Relay 4TR operates, locks, and closes ground to level D bank terminal 14 of switch 8SEND. Relay 4TR remains operated until relay 1BB restores on release.

*Call supervision*

As long as the ticketer is in use, the ticketer monitor lamp is lighted or flashing to indicate the following conditions:

| | |
|---|---|
| Bright steady lamp | Ticketer seized. |
| Dim flashing lamp (60 i.p.m.) | Call answered, "grace period" preceding conversation timing or a stop-dial condition. |
| Dim steady lamp | Call answered, ticketer timing the conversation. |
| Dim flashing lamp (120 i.p.m.) | Call completed, ticketer calling for a tabulator and transferring ticket data to it. |
| Bright flashing lamp (120 i.p.m.) | Ticket data transferred, ticketer in process of releasing. |
| Bright flashing lamp (60 i.p.m.) | Conversation interval 300 minutes or longer. |

CODER CIRCUIT OPERATION

*Translation*

When the associated codexer has received the area and/or office code, relay 11SA of the coder operates. Relay 11SA operates and locks to lead 1019. Ground is closed on lead 12START, 1200 ohm ground through relay 11SK is closed to lead 12HOLD, and lead 12ASR has been extended to the wiper cord terminals of rotary switch 9M1 of the codexer through lead 1001. Ground on lead 12START operates a translator assigner which will hunt for the coder calling for a translation. The motor magnet of a translator assigner operates self-interrupted until it reaches the coder calling for a translation. This coder has 1200 ohm ground on lead 12HOLD. When this coder is encountered, relay 11SK is in series with the motor magnet of the translator assigner. However, the motor magnet does not operate at this time.

Relay 11SK operates, grounds lead 1006 which operates the associated bar relay on leads 9HA, 9FA, 9FB, 9FC, 9FD, or 9FE of the translator. Ground is placed on lead 12RLY to operate bar relay 12BR, places 120 ohm battery to the number 1 winding of relay 11SL to lead 12ASSIGN.

Ground on the wiper cord terminals will operate the translator. The translator bar relay of the translator operates and gives the proper routing directive to the coder. Bar relay 12BR of the coder operates and the routing directive from the translator can now be stored in the codel relay units. Relay 11SL will not operate in series with relay HA of the translator. Ground on lead 12TA, 12TB, or 12TC or any combination of these leads operates their associated relay 11AK, 12BK and/or 12CK. When one or more of these relays 11AK, 12BK, or 12CK operates, a circuit is closed to relay 11KS, and operates the controlling circuit for the number of digits that are to be sent to the ticketer. Relay 11KS operates and steps rotary switch 11SEQ to normal through its interrupter and off-normal springs. When at normal, the off-normal springs restore and complete a circuit to rotary switch 9M1 in the codexer through lead 1004. All the rotary switches and the Strowger switch in the codexer restore. The vertical off-normal springs in the codexer restore and release relay 11SA. Relay 11SA restores, removes ground from lead 12START, and closes direct ground to lead 12HOLD. The translator assigner and the translator are released from this circuit for use by another coder circuit. Relay 11SK restores, releases the bar relay 12BR, and removes ground from a translator area bar relay through lead 6. Bar relay 12BR restores.

*Sending cycle*

Any one of the codel relays (12W11, 12X11, 12Y11, or 12Z11) operated, closes ground through leads 12W11, 12X11, 12Y11, or 12Z11, level C, D, E or F of switch 11SEQ, through leads 1022, 1023, 1024, or 1025 to the bank contact of switch 9M1, level CB in the codexer. This marks a sending control digit. A pulsing ground from the ticketer through lead 10CDC operates switch 9M1 and through lead 10CCC operates relay 10CA in the codexer.

Switch 9M1 scans, and when both wipers are simultaneously connected to ground, direct ground is forwarded to the ticketer through lead 10CAC and 10CDC. Relay 10CA operates on the first pulse from the ticketer and remains operated during each digit due to its slow to release characteristics. When relay 10CA restores, rotary switch 11SEQ steps to bank contact 1.

*Start sending immediately*

If the called number is used in association with Strowger or non-common control equipment, the coder directive may immediately be sent to the ticketer and out to the line. A ground marking on lead 12TE from the translator indicates this type of a call. When the coder received and stored the coded directive, ground was closed to relay 11TC. Relay 11TC operated and locked. After the first has been sent to the ticketer, the sequence switch steps to bank contact 1, and closes a circuit to relay 11LP, through level B of switch 11SEQ. Relay 11LP operates, shunts a resistor 11R1, and opens a circuit to relay 11TC. Relay 11TC remains operated due to its slow to release characteristics. When resistor 11R1 is shunted a "high-low" relay in the ticketer operated and prepared a ticketer for immediate sending. Relay 11TC restores and opens a circuit to relay 11LP. Relay 11LP restores. Switch 9M1 scans and the second digit of the coder directive is sent as before. Relay 10CA restores after each digit has been sent and steps the sequence switch to the next contact.

This operation will continue until the rotary switch 11SEQ arrives at bank contact number 7, thereby sending out the maximum number of digits of the coder directive that can be stored in the codel relay unit. The number of digits that are to be sent to the ticketer is controlled by leads 12TA, 12TB, and/or 12TC. Relays 11AK, 12BK, or 12CK are operated from leads 12TA, 12TB, or 12TC. One or a combination of these relays operate, closes a circuit to relay 11KS, and sets up a control circuit for the number of digits that are to be sent to the ticketer.

For the purpose of this explanation, it is assumed that five digits are to be sent to the ticketer. Relay 11AK operates from ground on lead 12TA and locks to relay 10CC of the codexer. Relay 11KS operates and the sending starts as before. Sequence switch 11SEQ steps from its normal position to contact number 1, to contact number 2 and so on to contact number 5. On contact number 5, ground is closed from the wipers of level B, through contact number 5 through lead 1021, and to relay 10TS to the codexer. The circuit will be released when relay 10TS operates as explained in the following section.

The following is a table showing the number of digits of the coded directive that are to be sent to the ticketer and the corresponding combinations of ground on lead 12TA, 12TB, or 12TC.

| Digit: | Combination of grounds |
|---|---|
| 2 | TA and TB and TC. |
| 3 | TA and TB. |
| 4 | TA and TC. |
| 5 | TA. |
| 6 | TB. |
| 7 | TC. |

*Start sending delayed*

If the number is associated with other than Strowger equipment such as common control equipment, the coded directive can not be sent immediately to the ticketer. The operator must first operate her keys and then the coded directive is sent as explained in the preceding section. Before the operator operates the key, the coded directive will be stored in the codel units.

*Translation fault*

If, for some reason, the coder fails to release the translator and the translator assigner promptly, a slow to release relay will restore in the translator assigner and close direct ground to lead 12ASSIGN only. Ground on lead 12ASSIGN closes the circuit to relay 11SL. Relay 11SL operates, locks, releases relay 11SA, and closes a circuit to relay 10TS of the codexer. Relay 10TS operates, closes 120IPM to lead 1009 which in turn flashes the monitor lamp, releases the ticketer, and releases this circuit as explained in the succeeding section. Relay 11SL restores, releases relay 10TS. Relay 10TS restores. The circuit is at normal.

*Release*

Relay 10TS of the codexer will operate and will release relays 10CS, 10CR, and 10CC of the codexer. Relays 10CS, 10CR and 10CC will restore. Ground from the number 1 winding of relay 10TS, through lead 1005, through the off-normal and interrupter springs, will step rotary switch 11SEQ self-interrupted to normal. When at normal, its off-normal springs restore. When relay 10CC restores, ground was removed from lead 1020, and relays 11AK, 12BK, and/or 12CK and the codel relays restore. When relays 11AK, 12BK, and/or 12CK restore, ground is removed from relay 11KS. Relay 11KS restores, removes direct ground from lead 12HOLD, and places 1200 ohms ground on lead 12HOLD. The circuit is now at normal.

*Seizure of codexer circuit*

When a ticketer requires a codexer, it will start the coder-codexer allotter searching for an idle coder-codexer. Resistance ground on lead 9CS through relay 10CR marks this circuit idle to the coder-codexer allotter. Relay 10CR will operate from resistance battery on lead 9CS through its number 1 winding and complete a circuit from the ticketer hunter wipers, through lead 10CHC to a motor magnet on lead 10M. The ticketer which originally requested a coder-codexer will have absence of ground on its associated 10CHC lead. The ticketer hunter scans for the calling ticketer and when it is encountered, ground is removed from lead 10CHC.

When this condition is encountered, a shunt will be moved from relay 10CC. Relay 10CC operates from resistance battery on lead 10M (magnet M in the ticketer hunter does not operate on this path), closes direct ground on lead 9CS to mark this circuit busy to the allotter, opens the operating circuit to relay 10RR, places resistance 10R2 ground on lead 1009 to light the monitor lamp, closes relay 10CA to lead 10CCC, closes lead 10CDC to lead 1011, closes relay 10CS to lead 1016, prepares a holding circuit for relays 11AK, 12BK, and 12CK, and the codel units through lead 1020, and shunts the number 1 winding of relay 10CR. Resistance battery from the ticketer through leads 10CPC, 1016, and 1017 will operate relay 10CS. Relay 10CS operates, closes the circuit to the number 2 winding of relay 10CR, opens the circuit to the number 1 winding of relay 10TS from lead 1005, and closes lead 1003 to lead 1007.

The office and/or the area code of the called number can now be forwarded from the ticketer to the codexer through the coder.

*Single translation*

A single translation may be provided for either the ABC office code or the X0X (or X1X) for an area code. The first three digits of a short haul ABC office code or the first three digits of a long haul X0X foreign area code will be pulsed to the coder-codexer by the ticketer through lead 10CDC.

*Single translation first digit*

(Digit A or digit X.) The pulsing path from the ticketer for the first digit is through lead 10CDC, lead 1011, through coder switch 11SEQ (normal position), lead 1010, to magnet 9M1 and simultaneously through lead 10CCC to relay 10CA.

On the first pulse of this digit, a ground circuit is closed to relay 10CA. Relay 10CA operates on the first pulse and remains operated for the entire digit due to its slow to release characteristics.

Magnet 9M1 follows the pulses on lead 10CDC and advances its wipers one step after each pulse. On the first step, its off-normal springs operate and prepare the circuit for release. At the end of the digit, relay 10CA restores, and steps rotary switch 11SEQ to bank contact number 1 to transfer the pulsing path from lead 1010 to lead 1013.

*Single translation second digit*

(Digit B, digit 1, or digit 0.) The pulsing path to the ticketer lead 10CDC, 1011, through coder switch 7SEQ (bank contact 1), relay 1013, is closed to the magnet 10VERT. On the first pulse of this digit, ground is closed simultaneously to the magnet 10VERT through lead 1013 and to relay 10CA through lead 10CCC. Relay 10CCC operates. Relay 10CA operates on the first pulse and remains operated for the entire digit due to its slow to release characteristics.

The magnet 10VERT follows the pulses on lead 10CDC and steps the wipers to the proper level. On the first step, the vertical off-normal springs operate, prepare the release circuit, and ground lead 1019, which prepares a holding circuit for relay 11SA of the coder. At the end of the second digit, relay 10CA restores and steps rotary switch 11SEQ to bank contact number 2 to transfer the pulsing path from lead 1013 to lead 1012.

*Single translation third digit*

(Digit C or digit X.) The pulsing path from the ticketer for the third digit is through lead 10CDC, lead 1011, through coder switch 11SEQ (bank contact number 2), lead 1012, to the magnet 10ROT and simultaneously through lead 10CCC to relay 10CA. Relay 10CA operates on the first pulse and remains operated for the entire digit due to its slow to release characteristics.

The magnet 10ROT follows the pulses and steps the wiper to the proper bank terminal. On the first step the rotary interrupter and rotary off-normal springs operate. The rotary off-normal springs operate and prepare the ground circuit to the wipers of level A, switch 9M2. The rotary interrupter springs operate and open and close ground to relay 11LP of the coder. Relay 11LP pulses and steps rotary switch 9M2. Rotary switch 9M2 takes one step for each pulse.

At the end of the second digit, relay 10CA restores and steps rotary switch 11SEQ to bank contact number 3 to close a circuit to relay 11SA of the coder. Relay 11SA of the coder operates and start the translator assigner hunting for the calling coder. When found, ground is returned through lead 12RSR and 1001 to the wipers of the Strowger switch. This will mark one of 800 leads to the translator so that a proper translation may be received by a coder. When this translation has been received relay 11SA of the coder restores and opens the Strowger switch wipers.

*Dual translation*

A dual translation may be provided for the X0X (or X1X) for an area code and the ABC office code. The six digits required for a dual translation will be pulsed to the coder-codexer by the ticketer through lead 10CDC.

*Dual translation first digit*

(Digit X.) The operation for the first digit pulse are as explained in the section entitled "Single translation first digit."

*Dual translation second digit*

(Digit 1 or digit 0.) The second digit of the area code is either "1" or "0." For the purpose of this explanation, it is assumed that the digit 1 is pulsed. The pulsing path from the ticketer through lead 10CDC, lead 1011, through coder switch 11SEQ (bank contact number 1), lead 1013, is closed to the magnet 10VERT. On the first pulse of this digit, ground is closed simultaneously to the magnet 10VERT through lead 1013, and to relay 10CA through lead 10CCC. Relay 10CA operates on the first pulse. The magnet 10VERT follows the dial pulse and steps the wipers to the first level. On the first pulse, the vertical off-normal springs and the left normal post springs operate. The vertical off-normal springs operate, prepare the release circuit, and ground leads 1019 which prepares a locking circuit for relay 11SA of the coder. The left normal post springs operate and prepare a circuit to the wipers of level E, of switch 9M1. At the end of the second digit when relay 10CA restores, it steps rotary switch 11SEQ in the coder to bank contact number 2 to prepare a circuit for the magnet 10ROT.

*Dual translation third digit*

(Digit X.) The pulsing path from the ticketer, through lead 10CDC, lead 1011, through switch 11SEQ in the coder, through lead 1012, is closed to the magnet 10ROT. On the first pulse of the third digit, ground is closed to the magnet 10ROT through lead 1012 and to relay 10CA through lead 10CCC. Relay 10CA operates on the first pulse and remains operated for the entire digit due to its slow to release characteristics.

The magnet 10ROT follows the dial pulses and will step the wipers to the dial bank terminal on the first pulse, the rotary interrupter springs and the right off-normal springs operate. The rotary off-normal springs operate preparing a circuit to the wipers of level A of switch 9M2. The rotary interrupter springs operate, and repeat the pulses to relay 11LP of the coder through lead 1015. Relay 11LP follows the pulses and repeats them through lead 1008 to magnet 9M2. Rotary switch 9M2 takes one step for each pulse. At the end of the third digit, relay 10CA restores, and steps rotary switch 11SEQ in the coder to bank contact number 3 which prepares a circuit to relay 11SA through the wipers of level B, switch 11SEQ, bank contact number 3, lead 1018, and lead 1027. Relay 11SA will not operate immediately due to its slow to operate characteristics, and will allow enough time to permit one of the five shunt field relays 9D1 to 9D5 (foreign area) to operate.

For the purpose of this explanation, it is assumed that foreign area "A" has been called. Ground through level A of switch 9M2 and ground through the left normal post springs (if second digit is 1), and level E of switch 9M1 will operate shunt field relay 9D1. Relay 9D1 operates and locks to relay 10CC. Ground from the wipers of level B, switch 11SEQ, through bank contact number 3, through lead 1018 will cause switch 9M1 to step self-interrupted until its off-normal springs restore, and energizes the magnet 11SEQ. When the off-normal springs of switch 9M1 restore, ground is closed to its release magnet 9RLS. The magnet 9RLS operates and restores the Strowger switch. The rotary off-normal springs, the left normal post springs, and the vertical off-normal springs restore. When the vertical off-normal springs restore magnet 11SEQ is opened, the magnet 9RLS is opened, and closes ground to switch 9M2 through its interrupter springs. Rotary switch 11SEQ steps to bank contact number 4. Rotary switch 9M2 restores to normal and releases its off-normal springs. The circuit is now prepared for dialling of digit A.

*Dual translation fourth digit*

(Digit A.) The operation for the fourth digit are as described in the section entitled "Single translation first digit."

*Dual translation fifth digit*

(Digit B.) The operations for the fifth digit are as explained in the section entitled "Single translation second digit."

*Dual translation sixth digit*

(Digit C.) The operations for the sixth digit are as explained in the section entitled "Single translation third digit" with the following exception: one of the relays 9D1 through 9D5 has been operated, therefore, rotary switch 9M2 will not be able to step with the pulses. Relay 11SA operates when rotary switch 11SEQ steps to bank contact number 7 after the release of relay 10CA. When the translator assigner has found the calling coder, ground is closed through lead 1001 and level B of switch 9M1 to one of the 800 possible bank terminals.

*Release from a foreign area call*

Restoration from relay 11KS in the coder closes ground to magnet 11SEQ to its off-normal and interrupter springs. Switch 11SEQ steps self-interrupted to normal. Its off-normal springs restore and transfer the rotary switch 9M1 through lead 1004. Switch 9M1 steps, self-interrupted, to normal, and restores its off-normal springs which transfer the circuit to the magnet 9RLS.

The magnet 9RLS operates and restores the Strowger switch. The off-normal springs restore and release the shunt field relays. The vertical off-normal springs restore, release the magnet 9RLS, and complete a circuit to the off-normal springs and interrupter springs of rotary switch 9M2. Switch 9M2 steps self-interrupted to normal and restores its off-normal springs. The coder-codexer is now prepared to send the coder directive to the ticketer. This operation and the final release are described in the associated section described in the coder operation.

*Release from a home area call*

The release operation from a home area call is the same as described in the preceding section.

*Ticketer sends more than ten pulses as a first digit*

If the ticketer sends more than ten pulses as the first digit, a path will be closed through level A of switch 9M1, bank contact 10 to the number 2 winding of relay 10TS. Relay 10TS operates, opens a circuit to the number two winding of relay 10CR, shorts the number 1 winding, lights the monitor lamp, and places 120IPM on lead 1009. Relay 10CR restores and releases relay 10CC. Relay 10CC restores, removes holding ground from lead 1020, and releases relay 10CS. Relay 10CS restores. Low resistance ground through the number 1 winding of relay 10TS steps switch 9M1 to normal. Relay 10TS restores and the circuit is at normal.

While there has been described in detail what is at present considered to be the preferred embodiment of my invention, it is to be further understood that various modifications both in structure and manner of operation may be made therein, without departing from the scope of my invention. It is contemplated to cover in the appended claims all such modifications as are within the true spirit and scope of the invention.

What is claimed is:

1. In a telephone system including a first and second exchange each having individual plural digit codes assigned thereto, each said exchange having a plurality of lines and switching apparatus, each of said lines in each of said exchanges being identified by a plural digit number, said first exchange comprising a plurality of toll ticketing repeaters, each said repeater having a plurality of registers and pulse generating means, said repeater held throughout a call to store the information pertaining to that particular call, said first exchange further comprising a common routing coder in operative circuit connection with said repeaters, and comprising a common tabulator and also an operator position, first means in said repeater responsive to the making of a call from a calling one of said lines in said first exchange to a called one of said lines in said second exchange for correspondingly selectively registering the dialed plural digit code of said called exchange and the dialed digits of the number identifying the called line in said second exchange in said plurality of registers, second means governed by the completion of said registering operation in said plurality of registers for calling in said operator position to obtain the calling party's identity, said pulse generating means in said repeater thereafter operated to pulse said coder to transmit series of digital impulses in accordance with the setting of said registers to said switching apparatus to set up a connection from said calling line to said called line, and other means in said repeater operated upon termination of said completed call to transfer the data registered in said registers to said tabulator.

2. In an automatic toll ticketing telephone system including a plurality of exchanges each having individual codes assigned thereto, each said exchange having a plurality of lines and switching apparatus; one of said plurality of exchanges comprising, a calling line, an operator position, a repeater including a register means, a pulse generating means and a dialing interval timer, said repeater held throughout a call to store the information pertaining to that particular call, a routing circuit operatively associated with said repeater, an external timer and a tabulator means associated with said repeater; first means in said register means for registering a code transmitted over said calling line, said dialing interval timer effective to cause said repeater to connect said calling line to said operator position upon non-completion of dialing within an allotted time, whereby the operator may ascertain the fault, and instruct the calling party in the proper procedure for a second attempt; first means in said repeater controlled by the registration of a code in said register means for connecting said calling line to said operator position, second means in said repeater operated in response to the registration of the calling line code in said register means as received from said operator position to send the code stored in said first means in said register means to said routing circuit under the control of said pulse generating means in said repeater; means in said routing circuit controlled by said repeater pulse generating means for selectively operating said switching apparatus in conformance with a routing directive corresponding to the assigned routing code, to extend a connection from said calling line to the corresponding called exchange, said repeater including conversation timing means activated upon a completed connection to said called line to time the duration of said completed call under the control of said external timer, and other means in said repeater operated upon termination of said completed call to transfer the data registered in said registers and said conversation timing means to said tabulator, and release means operated in response to the completed operation of said other means to release said repeater.

References Cited in the file of this patent

UNITED STATES PATENTS

| | | |
|---|---|---|
| 2,284,329 | Lesti | May 26, 1942 |
| 2,570,239 | Horwitz | Oct. 9, 1951 |
| 2,581,287 | Ostline | Jan. 1, 1952 |
| 2,718,557 | Boyer | Sept. 20, 1955 |
| 2,848,543 | Breed et al. | Aug. 19, 1958 |